US012136999B2

(12) United States Patent
Lu et al.

(10) Patent No.: US 12,136,999 B2
(45) Date of Patent: Nov. 5, 2024

(54) DATA TRANSMISSION METHOD AND APPARATUS AND COMMUNICATION SYSTEM

(71) Applicant: FUJITSU LIMITED, Kawasaki (JP)

(72) Inventors: Yang Lu, Beijing (CN); Qinyan Jiang, Beijing (CN); Guorong Li, Beijing (CN); Meiyi Jia, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 356 days.

(21) Appl. No.: 17/589,959

(22) Filed: Feb. 1, 2022

(65) Prior Publication Data

US 2022/0158765 A1    May 19, 2022

Related U.S. Application Data

(63) Continuation of application No. PCT/CN2019/100878, filed on Aug. 15, 2019.

(51) Int. Cl.
*H04L 1/08*    (2006.01)
*H04L 1/1867*    (2023.01)
*H04W 72/23*    (2023.01)

(52) U.S. Cl.
CPC .............. *H04L 1/08* (2013.01); *H04L 1/1867* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2010/0322172 A1* | 12/2010 | Hsu | H04L 1/1822 370/329 |
| 2019/0150180 A1 | 5/2019 | Zou et al. | |
| 2019/0190661 A1 | 6/2019 | You et al. | |
| 2020/0344835 A1 | 10/2020 | Wang et al. | |
| 2020/0351031 A1* | 11/2020 | Wu | H04L 1/1883 |

FOREIGN PATENT DOCUMENTS

| | | |
|---|---|---|
| CN | 109644085 A | 4/2019 |
| CN | 109906578 A | 6/2019 |

(Continued)

OTHER PUBLICATIONS

Notice of Reasons for Refusal issued by the Japan Patent Office for corresponding Japanese Patent Application No. 2022-507758, mailed on Feb. 21, 2023, with an English translation.

(Continued)

*Primary Examiner* — Walter J Divito
(74) *Attorney, Agent, or Firm* — Myers Wolin, LLC

(57) ABSTRACT

A data transmission apparatus includes a first transmitter. The first transmitter is configured to, when a first timer is running and a second timer is not running, transmit retransmission data according to a configuration grant corresponding to a first hybrid automatic repeat request (HARQ) process, and start the second timer if LBT is not failed for transmission of a transport block for the retransmission data, or, when the first timer is not running, transmit new data according to a configuration grant corresponding to the first HARQ process, and start the first timer and the second timer if LBT is not failed for transmission of a transport lock for the new data.

9 Claims, 10 Drawing Sheets

(56) References Cited

FOREIGN PATENT DOCUMENTS

| | | |
|---|---|---|
| CN | 110035502 A | 7/2019 |
| WO | 2018/144976 A2 | 8/2018 |

OTHER PUBLICATIONS

CATT, "UE behavior on configured grant timer upon DCI reception", Agenda Item: 10.3.1.8, 3GPP TSG-RAN WG2 NR AH-1801, R2-1800165, Vancouver, Canada, Jan. 26-27, 2018.

Qualcomm Inc., "Enhancement to configured grants in NR unlicensed", Agenda Item: 7.2.2.2.4, 3GPP TSG-RAN WG1 Meeting #97, R1-1907264, Reno, US, May 13-17, 2019.

Examination Report issued by the Indian Patent Office for corresponding Indian Patent Application No. 202237005765, dated Jul. 7, 2022, with an English translation.

First Notification of Office Action and Search Report issued by the China National Intellectual Property Administration for corresponding Chinese Patent Application No. 201980099167.9, mailed on Oct. 28, 2023, with an English translation.

International Search Report and Written Opinion of the International Searching Authority issued by the China National Intellectual Property Administration for corresponding International Patent Application No. PCT/CN2019/100878, dated Apr. 28, 2020, with an English translation.

Qualcomm Incorporated, "Remaining Aspects of Configured Grant Transmission for NR-U", Agenda Item: 11.2.1.2, 3GPP TSG-RAN WG2 Meeting #106, R2-1906414, Reno, USA, May 13-17, 2019.

Mediatek Inc., "Configured grant retransmission timer", Agenda Item: 11.2.1.2, 3GPP TSG-RAN WG2 Meeting #106, R2-1907056, Reno, USA, May 13-17, 2019.

Extended European search report with the supplementary European search report and the European search opinion issued by the European Patent Office for corresponding European Patent Application No. 19940978.0-1213, mailed on Jun. 20, 2022.

Notice of Preliminary Rejection issued by the Korean Intellectual Property Office for corresponding Korean Patent Application No. 10-2022-7004244, mailed on Apr. 27, 2024, with an English translation.

\* cited by examiner

DATA TRANSMISSION METHOD AND APPARATUS AND COMMUNICATION SYSTEM

CROSS-REFERENCE TO RELATED APPLICATION

This application is a continuation application of International Application PCT/CN2019/100878 filed on Aug. 15, 2019 and designated the U.S., the entire contents of which are incorporated herein by reference.

TECHNICAL FIELD

This disclosure relates to the field of wireless communication technologies.

BACKGROUND

Traditional cellular wireless networks serving the public can only use licensed spectra and unlicensed or shared spectra, for example, the 5 GHz frequency band and 2.4 GHz frequency band are frequency bands used by wireless devices such as Wi-Fi and Bluetooth for enterprises or individuals. With the advancement of technologies, deployment of cellular wireless networks has been extended to unlicensed frequency bands.

Traditional uplink scheduling is dynamic authorization based on a physical downlink control channel (PDCCH), wherein a network device transmits to a terminal equipment PDCCH signaling carrying uplink resource authorization for each uplink transmission, and the terminal equipment transmits uplink data on authorized resources.

Current communication standards also support the configured grant (CG) technique. In the configured grant technique, a network device may configure a terminal equipment with an uplink grant of a specified period via radio resource control (RRC) signaling, and the terminal equipment may transmit data on uplink resources of the configured grant (CG) appearing periodically without needing to PDCCH signaling transmitted by the network device in advance.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

Current communication standards support a terminal equipment to transmit new data on an uplink resource of a configured grant (CG), and schedule uplink CG data retransmission by using a dynamic grant method.

It was found by the inventors that as a network device needs to perform channel access detection in transmitting scheduling signaling, the use of dynamic authorization to schedule uplink CG data retransmission greatly increases transmission latency and reduces transmission efficiency. If retransmission data are transmitted on uplink resources of configured grant, a problem may occur that the terminal equipment is unable to determine whether to transmit new data or retransmission data on CG resources.

Embodiments of this disclosure provide a data transmission method and apparatus and communication system, in which whether to transmit new data or retransmission data on CG resources according to state(s) of process(es) of a timer and/or a hybrid automatic repeat request (HARQ). Thus, uplink resources of configured grant may be used to transmit retransmission data, thereby improving efficiency of data transmission.

According to a first aspect of the embodiments of this disclosure, there is provided a data transmission method, applicable to a terminal equipment, the method including: determining that a first timer is running and a second timer is not running, transmitting retransmission data according to a configured grant corresponding to a first hybrid automatic repeat request (HARQ) process, and starting the second timer; or, determining that the first timer is not running, transmitting new data according to a configured grant corresponding to the first HARQ process, and starting the first timer and the second timer.

According to a second aspect of the embodiments of this disclosure, there is provided a data transmission method, applicable to a terminal equipment, the method including: determining that a process state of a first HARQ process is a second state (ACK), transmitting new data according to a configured grant to which the first HARQ process corresponds, setting a process state to which the first HARQ process corresponds to be a first state (NACK), and starting a first timer and a second timer; or, determining that a process state of the first HARQ process is a first state (NACK) and the second timer is not running, transmitting retransmission data according to a configured grant corresponding to the first HARQ process, and starting the second timer.

According to a third aspect of the embodiments of this disclosure, there is provided a data transmission method, applicable to a network device, the method including: receiving data of a first HARQ process transmitted by a terminal equipment on a resource of a configured grant; and receiving uplink control information (UCI) used for indicating the configured grant information of the first HARQ process transmitted by the terminal equipment, wherein the UCI contains a process identification of the first HARQ process, a network identifier of the terminal equipment and redundancy version (RV) information of a transport block of the first HARQ process.

According to a fourth aspect of the embodiments of this disclosure, there is provided a data transmission apparatus, applicable to a terminal equipment, the apparatus carrying out the data transmission method as described in the first aspect of the embodiments of this disclosure.

According to a fifth aspect of the embodiments of this disclosure, there is provided a data transmission apparatus, applicable to a terminal equipment, the apparatus carrying out the data transmission method as described in the second aspect of the embodiments of this disclosure.

According to a sixth aspect of the embodiments of this disclosure, there is provided a data transmission apparatus, applicable to a network device, the apparatus carrying out the data transmission method as described in the third aspect of the embodiments of this disclosure.

According to a seventh aspect of the embodiments of this disclosure, there is provided a terminal equipment, including the data transmission apparatus as described in the fourth or fifth aspect of the embodiments of this disclosure.

According to an eighth aspect of the embodiments of this disclosure, there is provided a network device, including the data transmission apparatus as described in the sixth aspect of the embodiments of this disclosure.

According to a ninth aspect of the embodiments of this disclosure, there is provided a communication system, including the terminal equipment as described in the seventh aspect of the embodiments of this disclosure and the network device as described in the eighth aspect of the embodiments of this disclosure.

According to a tenth aspect of the embodiments of this disclosure, there is provided a computer readable program, which, when executed in a data transmission apparatus or a terminal equipment, causes the data transmission apparatus or the terminal equipment to carry out the data transmission method as described in the first or second aspect of the embodiments of this disclosure.

According to an eleventh aspect of the embodiments of this disclosure, there is provided a computer storage medium, including a computer readable program, which causes a data transmission apparatus or a terminal equipment to carry out the data transmission method as described in the first or second aspect of the embodiments of this disclosure.

According to a twelfth aspect of the embodiments of this disclosure, there is provided a computer readable program, which, when executed in a data transmission apparatus or a network device, causes the data transmission apparatus or the network device to carry out the data transmission method as described in the third aspect of the embodiments of this disclosure.

According to a thirteenth aspect of the embodiments of this disclosure, there is provided a computer storage medium, including a computer readable program, which causes a data transmission apparatus or a network device to carry out the data transmission method as described in the third aspect of the embodiments of this disclosure.

An advantage of the embodiments of this disclosure exists in that whether to transmit new data or retransmission data on CG resources according to state(s) of process(es) of a timer and/or a hybrid automatic repeat request (HARQ). Thus, uplink resources of configured grant may be used to transmit retransmission data, thereby improving efficiency of data transmission.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION OF THE DISCLOSURE

Figure 1:
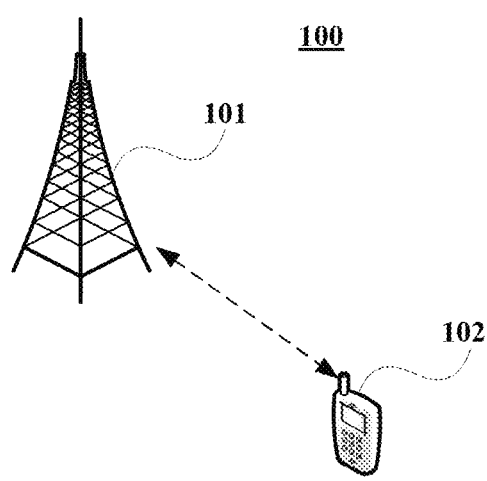
FIG. 1 is schematic diagram of a communication system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (genescalen), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" refers to, for example, equipment accessing to a communication network and receiving network services via a network device, and may also be referred to as "terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

FIG. 1 is a schematic diagram of a communication system of an embodiment of this disclosure, in which a case where a terminal equipment and a network device are taken as examples is schematically shown. As shown in FIG. 1, a communication system 100 may include a network device 101 and a terminal equipment 102 (for the sake of simplicity, an example having only one terminal equipment is schematically given in FIG. 1).

In the embodiment of this disclosure, existing traffics or traffics that may be implemented in the future may be performed between the network device 101 and the terminal equipment 102. For example, such traffics may include but not limited to enhanced mobile broadband (eMBB), massive machine type communication (MTC), and ultra-reliable and low-latency communication (URLLC), etc.

The terminal equipment 102 may transmit data to the network device 101, for example, in a grant-free transmission mode. The network device 101 may receive data transmitted by one or more terminal equipments 102, and feed back information (such as acknowledgement ACK/non-acknowledgement NACK) to the terminal equipment 102, and the terminal equipment 102 may acknowledge terminating a transmission process according to the feedback information, or may further perform new data transmission, or may perform data retransmission.

Following description shall be given by taking that a network device in a communication system is a receiver end and a terminal equipment is a transmitter end as an example. However, this disclosure is not limited thereto, and the transmitter end and/or the receiver end may also be other devices. For example, this disclosure is applicable to not only uplink grant-free transmission between a network device and a terminal equipment, but also sidelink grant-free transmission between two terminal equipments.

In the following aspects of the embodiments of this disclosure, a meaning of starting a first timer is: when the first timer is in a state of out of running or running of the first timer expires, starting the first timer; or, when the first timer is in a running state, starting the first timer again, that is, restarting.

In the following aspects of the embodiments of this disclosure, a meaning of starting a second timer is: when the second timer is in a state of out of running or running of the second timer expires, starting the second timer; or, when the second timer is in a running state, starting the second timer again, that is, restarting.

In the following aspects of the embodiments of this disclosure, whether new data are transmitted or data are retransmitted on a resource of configured grant (CG) is determined according to a state of a timer and/or a hybrid automatic repeat request (HARQ) process. Thus, retransmission data may be transmitted by using an uplink resource of configured grant, thereby improving efficiency of data transmission; and furthermore, a problem that a terminal equipment is difficult to determine whether to transmit new data or retransmit data on a CG resource may be avoided.

First Aspect of the Embodiments

The first aspect of the embodiments provides a data transmission method, applicable to a terminal equipment, such as a terminal equipment 102.

Figure 2:
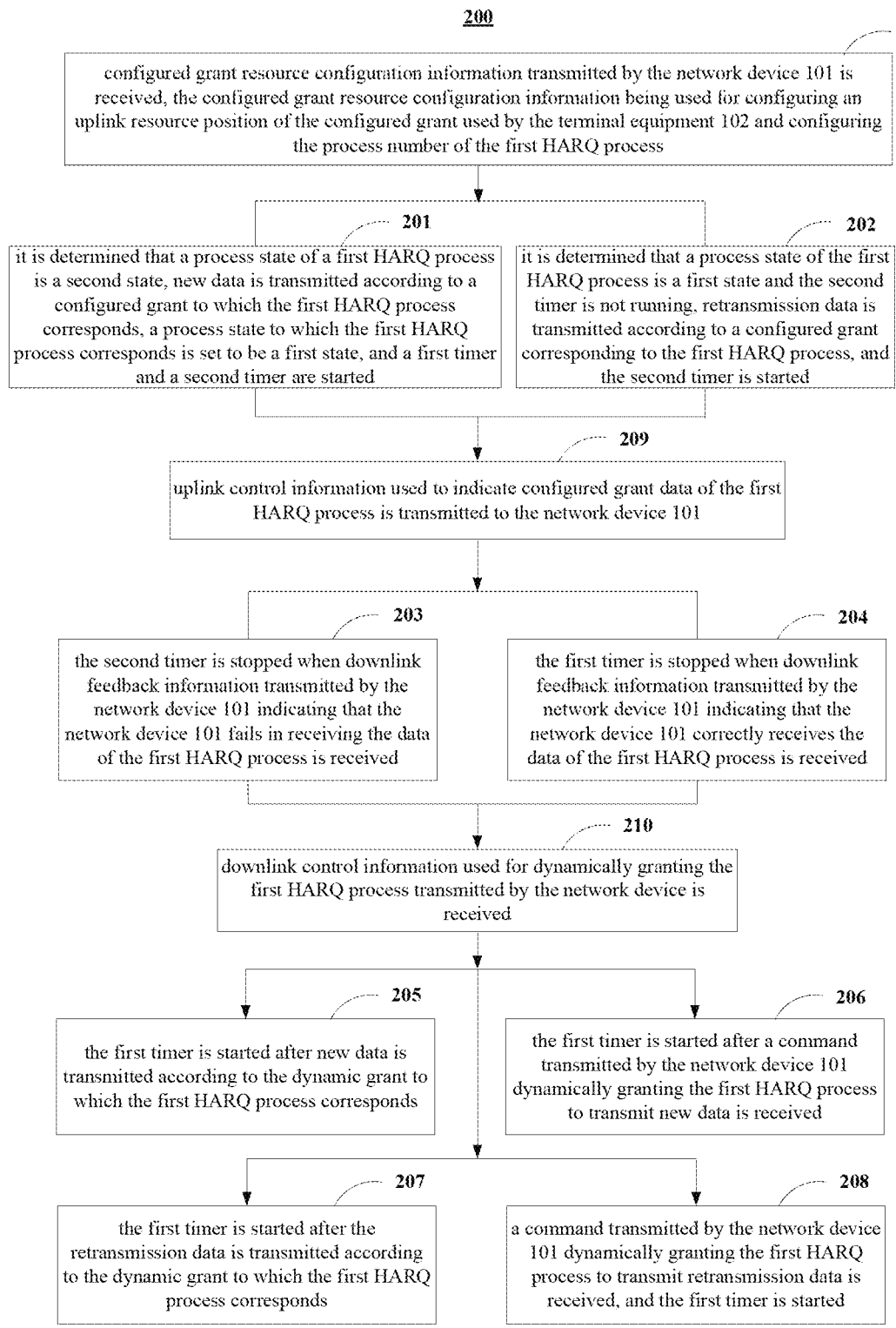
FIG. 2 is a schematic diagram of the data transmission method of the first aspect of the embodiments of this disclosure.

FIG. 2 is a schematic diagram of the data transmission method of the first aspect of the embodiments of this disclosure. As shown in FIG. 2, the data transmission method 200 may include at least of the following operation 201 and operation 202:

operation 201: it is determined that a process state of a first HARQ process is a second state (ACK), new data is transmitted according to a configured grant to which the first HARQ process corresponds, a process state to which the first HARQ process corresponds is set to be a first state (NACK), and a first timer and a second timer are started; and operation 202: it is determined that a process state of the first HARQ process is a first state (NACK) and the second timer is not running, retransmission data is transmitted according to a configured grant corresponding to the first HARQ process, and the second timer is started.

According to the first aspect of the embodiments of this disclosure, in operation 201 or operation 202, according to the timer and the state of the hybrid automatic repeat request (HARQ) process, the new data or retransmission data are transmitted on the resource of configured grant (CG). Thus, retransmission data may be transmitted by using an uplink resource of configured grant, thereby improving efficiency of data transmission; and furthermore, a problem that a terminal equipment is difficult to determine whether to transmit new data or retransmit data on a CG resource may be avoided.

In the first aspect of the embodiments of this disclosure, the first timer may be a configured grant (CG) timer, and the second timer may be a configured grant (CG) retransmission timer.

In the first aspect of the embodiments of this disclosure, the first HARQ process is an HARQ process configured by a network device for the terminal equipment in which uplink configured grant transmission may be performed; the first HARQ process may correspond to the first timer and the second timer, for example, each first HARQ process may maintain a first timer and a second timer; and the first HARQ process corresponds to a process state, for example, each first HARQ process may maintain a process state, an initial value of the process state being the second state (ACK).

In at least one embodiment, in operation 201 and operation 202, when the first timer expires, the process state of the first HARQ process may be set to the second state (ACK).

In at least one embodiment, in operation 202, that the second timer is not running includes: the second timer being not started, the second timer stopping after it expires, or the terminal equipment 102 making the second timer stopped after the terminal equipment 102 receives downlink feedback information to which the first HARQ corresponds transmitted by the network device 101.

In at least one embodiment, a length of the second timer may be less than a length of the first timer, hence, it may be avoided that retransmission data of the HARQ process are always unable to be transmitted.

In at least one embodiment, in operation 201, operations of transmitting the new data according to the configured grant to which the first HARQ process corresponds and setting the process state to which the first HARQ process corresponds to be the first state may be, for example, determining that a new data indication (NDI) of the first HARQ process is inverse, generating a new data transport block of the first HARQ process in a media access control (MAC) layer, setting the process state to which the first HARQ process corresponds to be the first state (NACK), and transmitting the new data transport block.

In at least one embodiment, in operation 201, operations of starting the second timer and starting the first timer may be, for example, determining that the new data are successfully transmitted, and then starting the second timer and starting the first timer.

In at least one embodiment, in operation 202, the operation of transmitting retransmission data according to the configured grant to which the first HARQ process corresponds may be, for example, determining that there exists a transport block in a buffer of the first HARQ process, and transmitting the transport block in the buffer of the first HARQ process. In addition, transmitting the retransmission data may be performed when it is determined that the state of the new data indication (NDI) of the first HARQ process is not inversed.

In at least one embodiment, operations of transmitting retransmission data according to the configured grant to which the first HARQ process corresponds and starting the second timer in operation 202 may be, for example, determining that a state of the new data indication (NDI) of the first HARQ process is not inversed, then retransmitting the retransmission data, determining that the retransmission data are successfully transmitted, and starting the second timer.

In at least one embodiment, as shown in FIG. 2, following operations may further be included in operation 202: determining that a first time of transmission of the retransmission data is successful, and starting the first timer. Hence, in operation 202, in a case where the first time of transmission of the retransmission data is successful, both the second timer and the first timer are started.

In at least one embodiment, in addition to transmitting the HARQ data of CG transmission on the CG resource by the terminal equipment 102, the network device 101 may further actively schedule the new data or retransmission data of the CG HARQ process, that is, the terminal equipment may transmit the data of the CG HARQ process on an uplink resource dynamically scheduled by the network device.

In order to avoid confusion in management of an HARQ process caused by the terminal equipment 102 transmitting data of the HARQ process on the CG resource while the network device 101 dynamically scheduling the same CG HARQ process, in at least one embodiment, after the network device 101 dynamically schedules the CG HARQ process, the terminal equipment 102 is unable to transmit the data of the HARQ process on the CG resource, and is unable to transmit the new data of the HARQ process on the CG resource, that is, on the premise that it is determined that no data is transmitted at a dynamic grant to which the HARQ process corresponds and no command transmitted by the network device 101 is received dynamically granting the HARQ process to transmit data, the terminal equipment 102 may transmit the new data or the retransmission data on the CG resource to which the HARQ process corresponds (unless the state of the process is ACK). Thus, after the network device 101 dynamically schedules the CG HARQ process, the terminal equipment 102 does not a CG retransmission timer of the HARQ.

For example, in operation 201 and operation 202, the new data or retransmission data are transmitted according to the configured grant to which the first HARQ process corresponds on the premise that: it is determined that there exists no data is transmitted at a dynamic grant to which the first HARQ process corresponds, and a command transmitted by the network device 101 dynamically granting the first HARQ process to transmit data is not received.

In at least one embodiment, as shown in FIG. 2, the data transmission method 200 further includes:

operation 203: the second timer is stopped when downlink feedback information (DFI) transmitted by the network device 101 indicating that the network device 101 fails in receiving the data of the first HARQ process is received; or operation 204: the first timer is stopped when downlink feedback information (DFI) transmitted by the network device 101 indicating that the network device 101 correctly receives the data of the first HARQ process is received.

In operation 203, when the DFI indicates that the network device 101 fails in receiving the data of the first HARQ process, the DFI may be, for example, HARQ-NACK information.

In operation 204, when the DFI indicates that the network device 101 correctly receives the data of first HARQ process, the DFI may be for example, HARQ-ACK information.

With operation 203 or operation 204, the terminal equipment 102 may stop a corresponding timer in a timely manner according to the downlink feedback information transmitted by the network device 102, so that retransmission or new transmission of the data may be performed before the first timer or the second timer expires, thereby reducing latency of data transmission.

In at least one embodiment, as shown in FIG. 2, operation 203 may further include the following operation: setting the process state of the first HARQ process to be the first state (NACK). And operation 204 may further include the following operation: setting the process state of the first HARQ process to be the second state (ACK). As a result, the process state of the first HARQ process may be set in time according to the downlink feedback information in operation 203 and operation 204, which facilitates a next time of data transmission in time, thereby reducing latency of data transmission.

In at least one embodiment, as shown in FIG. 2, the data transmission method 200 may further include one of the following operations 205 and 206:

operation 205: the first timer is started after new data is transmitted according to the dynamic grant to which the first HARQ process corresponds; and operation 206: the first timer is started after a command transmitted by the network device 101 dynamically granting the first HARQ process to transmit new data is received.

According to operation 205 or operation 206, when the network device dynamically schedules the CG HARQ process to transmit new data, the first timer may also be started at an appropriate time.

In at least one embodiment, in operation 205, the operation of starting the first timer after transmitting the new data according to the dynamic grant to which the first HARQ process corresponds may include, for example, transmitting the new data according to the dynamic grant to which the first HARQ process corresponds, and starting the first timer when it is determined that the new data is successfully transmitted.

In at least one embodiment, as shown in FIG. 2, the data transmission method 200 may further include one of the following operations 207 and 208:

operation 207: the first timer is started after the retransmission data is transmitted according to the dynamic grant to which the first HARQ process corresponds; and operation 208: a command transmitted by the network device 101 dynamically granting the first HARQ process to transmit retransmission data is received, and the first timer is started.

According to operation 207 or operation 208, when the network device dynamically schedules the CG HARQ process to transmit the retransmission data, the first timer may also be started at an appropriate time.

In at least one embodiment, in operation 207, the operation of starting the first timer after transmitting the new data according to the dynamic grant to which the first HARQ process corresponds may include, for example, transmitting the retransmission data according to the dynamic grant to which the first HARQ process corresponds, and starting the first timer when it is determined that the retransmission data are successfully transmitted.

In at least one embodiment, as shown in FIG. 2, the data transmission method 200 may further include:

operation 209: uplink control information (UCI) used to indicate configured grant information of the first HARQ process is transmitted to the network device 101.

In operation 209, the uplink control information (UCI) may include: a network identifier of the terminal equipment 102, such as a cell-radio network temporary identifier (C-RNTI) of the terminal equipment 102 or a configured scheduling-radio network temporary identifier (CS-RNTI), wherein the C-RNTI or CS-RNTI may be of 16 bits.

In at least one embodiment, configured grant data that are the new data or retransmission data of the first HARQ process may be indicated via the network identifier of the terminal equipment 102 in the uplink control information (UCI) to the network device 101; for example, the C-RNTI of the terminal equipment 102 may be used to indicate the new data of the first HARQ process, and the CS-RNTI of the terminal equipment 102 may be used to indicate the retransmission data of the first HARQ process.

In operation 209, the uplink control information (UCI) may further include: information of the new data indication (NDI) of the first HARQ process.

In at least one embodiment, the information of the new data indication (NDI) of the first HARQ process in the uplink control information may indicate that the configured grant data are the new data or retransmission data of the first HARQ process; for example, if the new data indication (NDI) is identical to new data indication (NDI) of a last HARQ process, that is, the new data indication (NDI) is not inversed, which indicates that the configured grant data are the retransmission data of the first HARQ process; and if the new data indication (NDI) is different from the new data indication (NDI) of the last HARQ process, that is, the new data indication (NDI) is inversed, which indicates that the configured grant data are the new data of the first HARQ process.

In at least one embodiment, the uplink control information (UCI) in operation 209 may further include: a process identifier of the first HARQ process, such as a process number (HARQ ID) of the first HARQ process; and redundancy version (RV) information of a transport block of the first HARQ process.

In at least one embodiment, in operation 209, when the configured grant data of the first HARQ process have never been successfully transmitted, the UCI indicates that the configured grant data are new data; otherwise, the UCI indicates that the configured grant data are retransmission data.

In at least one embodiment, as shown in FIG. 2, the data transmission method 200 further includes:

operation 210: downlink control information (DCI) used for dynamically granting the first HARQ process transmitted by the network device is received.

In operation 210, the downlink control information (DCI) includes a process number (HARQ ID) of the first HARQ process and redundancy version (RV) information of the first HARQ process transport block; wherein the downlink control information (DCI) may be scrambled by the network identifier of the terminal equipment 102, the network identifier of the terminal equipment 102 being, for example, a C-RNTI or a CS-RNTI.

In at least one embodiment, the network identifier of the terminal equipment 102 in the downlink control information (DCI) may be used to indicate that the data of the dynamic grant are new data or retransmission data of the first HARQ process. For example, the C-RNTI of the terminal equipment 102 may be used to indicate the new data of the first HARQ process, and the CS-RNTI of the terminal equipment 102 may be used to indicate the retransmission data of the first HARQ process.

In at least one embodiment, the downlink control information (DCI) further includes new data indication (NDI) information of the first HARQ process. The new data indication information in the downlink control information (DCI) is used to indicate that the dynamic grant data of the terminal equipment 102 are the new data or retransmission data of the first HARQ process; for example, if the new data indication (NDI) in the downlink control information (DCI) is identical to new data indication (NDI) of a last HARQ process, that is, the new data indication (NDI) is not inversed, which indicated that the dynamic grant data are the retransmission data of the first HARQ process, and if the new data indication (NDI)) is different from the new data indication (NDI) of the last HARQ process, that is, the new data indication (NDI) is inversed, which indicates that the dynamic grant data are the new data of the first HARQ process.

In at least one embodiment, as shown in FIG. 2, the data transmission method 200 further includes:

operation 211: configured grant resource configuration information transmitted by the network device 101 is received, the configured grant resource configuration information being used for configuring an uplink resource position of the configured grant used by the terminal equipment 102 and configuring the process number of the first HARQ process.

In operation 211, the CG resource configuration information may include: a period of an uplink resource of configured grant, a duration of the uplink resource of configured grant, and an offset of the uplink resource of configured grant in the period. For example, the period, duration and offset are in units of orthogonal frequency division multiplexing (OFDM) symbols, slots, or subframes.

The terminal equipment 102 may transmit data on CG (configured grant) uplink resources that appear periodically without receiving PDCCH signaling transmitted by the network device 101 in advance. For example, in operation 201 or operation 202, the terminal equipment may transmit new data or retransmit data on an uplink resource of configured grant to which the first HARQ process corresponds.

According to the first aspect of the embodiments of this disclosure, in operation 201 or operation 202, the new data or retransmission data are transmitted on the configured grant (CG) resource according to the timer and the state of the hybrid automatic repeat request (HHARQ) process. Thus, the configured grant uplink resource may be used to transmit the retransmission data, thereby improving efficiency of data transmission; furthermore, a problem that the terminal equipment is hard to determine whether to transmit new data or retransmit data on CG resources may be avoided.

Furthermore, according to the first aspect of the embodiments of this disclosure, in a case where the terminal equipment 102 operates on an unlicensed frequency band, if a physical layer is successful in performing Listen Before Talk (LBT), the terminal equipment 102 may transmit data, and if the physical layer fails in performing LBT, the terminal equipment 102 is unable to transmit data. In the case of failure of LBT, although an MAC layer of the terminal equipment 102 has generated the data of the first HARQ process, the data of the first HARQ process still exist in the HARQ data buffer.

In the case of failure of LBT of the physical layer, as data are not actually transmitted, neither the first timer nor the second timer is started; after the MAC layer HARQ process of the terminal equipment 102 requests to transmit new data or retransmission data on the CG resource, the second timer is started only when the LBT of the physical layer is successful (that is, after the data are transmitted successfully), and the first timer is started only after the terminal equipment 102 successfully transmits new data on the CG resource (that is, the HARQ data are successfully transmitted for a first time). The terminal equipment 102 starts the first timer only after successfully transmitting new data or retransmitting data on the uplink resources of the HARQ process dynamically scheduled by the network device. In addition, if the HARQ data fail in being transmitted on the CG resource (that is, the LBT fails), the data are continued to be transmitted on a next CG resource, and the uplink control information (UCI) transmitted together with the data may be identical to or different from UCI transmitted together with data last time when LBT fails, such as an RV identical to or different from that of the last time of data transmission.

Furthermore, after the MAC layer of the terminal equipment 102 transmits the new data in the HARQ process, the state of the first HARQ process is set to be the first state (NACK), no matter whether LBT of the physical layer is successful. Thus, it may be prevented that before the physical layer is successful in transmitting the HARQ data, new data are transmitted again on the CG resource by an HARQ entity of the MAC layer, which cover original data in the HARQ buffer failing in being transmitted due to failure of LBT.

It should be noted that FIG. 2 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 2.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

The first aspect of the embodiments of this disclosure shall be exemplarily described below by way of examples. In the following specific implementations, the HARQ process is the first HARQ process, and each HARQ process maintains a first timer and a second timer; wherein the first timer is, for example, a CG timer, and the second timer is, for example, a CG retransmission timer, the first state of the HARQ process is a NACK state, and the second state of the HARQ process is an ACK state.

Implementation 1

In this implementation, after the new HARQ process data are transmitted on the CG resource, the CG timer is started, thereby preventing a situation where after transmitting the new data on the CG resource, the terminal equipment is unable to transmit new data due to not receiving the downlink feedback information (DFI) transmitted by the network device.

After transmitting the new data or retransmission data of the HARQ process on the CG resource, the terminal equipment 101 starts the CG retransmission timer.

The terminal equipment 101 performs the following operations:

for each CG resource that appears periodically, when the CG retransmission timer of the HARQ process is not running and the process state of the HARQ process is NACK, the terminal equipment 102 transmits the retransmission data of the HARQ process on the CG resource and starts the CG retransmission timer;

when the process state of the HARQ process is ACK, the terminal equipment 102 transmits new transmission data of the HARQ process on the CG resource, sets the process state of the HARQ process to be NACK, and starts the CG timer and the CG retransmission timer;

when the CG timer of the HARQ process expires, the terminal equipment 102 sets the process state of the HARQ process to be ACK.

The UCI transmitted together with the data on the CG resource may indicate the HARQ process information to the network device 101. The UCI includes the HARQ process identifier, the network identifier of the terminal equipment, and the redundancy version (RV) information of the HARQ process transport block, and the UCI may be used to indicate to the network device 101 whether the data are new data or retransmission data of the HARQ process.

After the network device 101 receives the HARQ data transmitted by the terminal equipment 102 on the CG resource, it transmits downlink feedback information to the terminal equipment 102 to indicate whether the HARQ data are correctly received by the network device 101. For example, that the feedback information is HARQ-ACK indicates that the HARQ data are correctly received by the network device 101, and that the feedback information is HARQ-NACK indicates that the HARQ data are not correctly received by the network device 101.

If the terminal equipment 102 receives the HARQ-NACK, the terminal equipment 102 may stop the CG retransmission timer that is being run in the HARQ process, and furthermore, it may set the process state of the HARQ process to be NACK; and if the terminal equipment receives the HARQ-ACK, the terminal equipment sets the process state to be ACK and stops the CG retransmission timer that is being run in the HARQ process.

Figure 3:
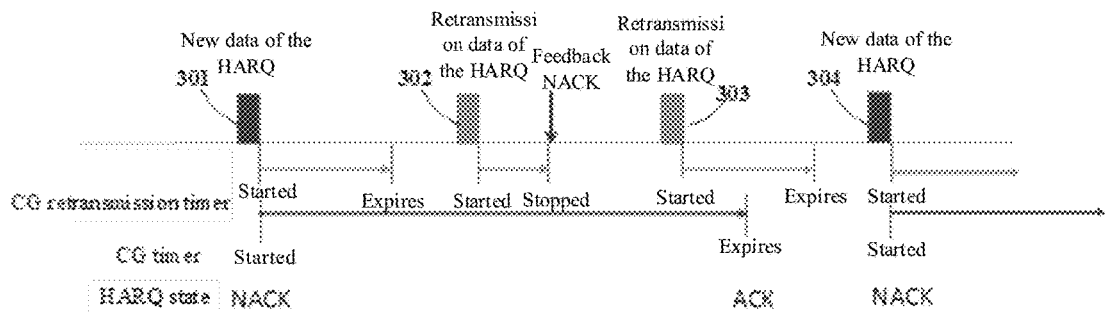
FIG. 3 is a schematic diagram of a timer and a process state of an HARQ process in Implementation 1 of the first aspect of the embodiments of this disclosure.

FIG. 3 is a schematic diagram of the timer and the process state of the HARQ process in Implementation 1 of the first aspect of the embodiments of this disclosure.

As shown in FIG. 3, after the terminal equipment 102 transmits the new data of the HARQ process on the CG resource 301, it sets the process state to be an NACK state. For example, if transmission of the new data of the HARQ is triggered, the MAC layer of the terminal equipment 102 sets the state of the HARQ process to be the NACK state.

As shown in FIG. 3, the terminal equipment 102 starts the CG timer and the CG retransmission timer after transmitting the new data of the HARQ on the CG resources. On a first CG resource 302 after the new data are transmitted, the CG retransmission timer of the HARQ process is not running (expires) and the state of the HARQ process is NACK, and the terminal equipment may initiate data retransmission of the HARQ, and start the CG retransmission timer after retransmission of data.

As shown in FIG. 3, after transmitting the retransmission data, the terminal equipment 102 receives HARQ-NACK feedback transmitted by the network device 101 for the retransmission data, and the terminal equipment stops the CG retransmission timer, and may further set the state of the HARQ to be the NACK state. On a second CG resource 303 where the new data are transmitted, the CG retransmission timer of the HARQ process is not running (stopped) and the state of the HARQ process is NACK, hence, the terminal equipment may initiate data retransmission of the HARQ again and start the CG retransmission timer. After the second time of transmitting retransmission data, the CG timer expires, and the terminal equipment sets the state of the HARQ to be the ACK state.

As shown in FIG. 3, on a third CG resource 304 after transmitting the new data, the state of the HARQ process is ACK, hence, the terminal equipment may initiate new data transmission of the HARQ.

In this embodiment, if the transmission of the data of the HARQ on the CG resource fails (for example, the LBT fails), the data of the HARQ are continued to be transmitted on a next CG resource, and UCI transmitted together with the data may be identical to or different from UCI transmitted together with data last time when LBT fails, such as an RV identical to or different from that of the last time of data transmission. If a transport block has never been successfully transmitted, the UCI transmitted together with the transport block indicates that the transport block is new data. After a transport block is successfully transmitted, the CG retransmission timer is started; and if it is a first time of successfully transmitting a transport block, the CG timer is started in addition to starting the CG retransmission timer.

Figure 4:
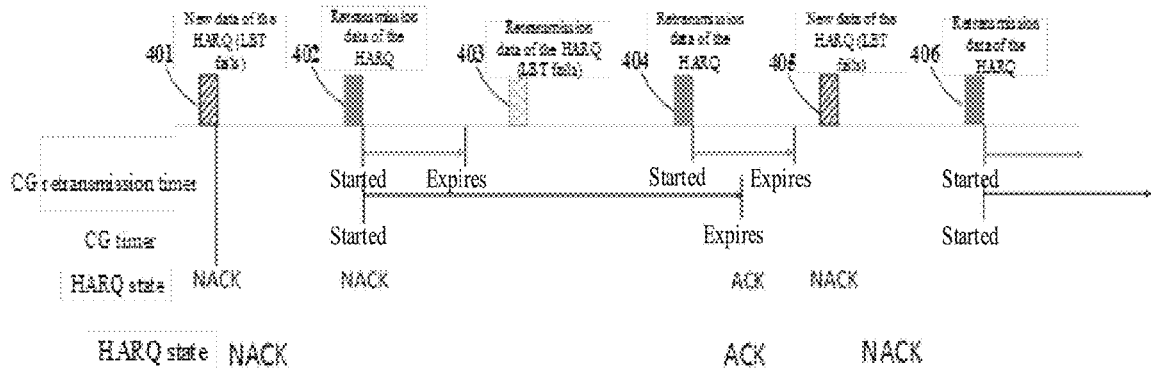
FIG. 4 is another schematic diagram of the timer and the process state of the HARQ process in Implementation 1 of the first aspect of the embodiments of this disclosure.

FIG. 4 is another schematic diagram of the timer and the process state of the HARQ process in Implementation 1 of the first aspect of the embodiments of this disclosure, illustrating that the state of the HARQ process is first set to be NACK no matter whether the LBT of the physical layer is successful when the MAC layer generates a new transport block, so as to prevent that before the HARQ data are successfully transmitted, new data are transmitted again on the CG resource by an HARQ entity of the MAC layer, which cover original data in the HARQ buffer failing in being transmitted due to failure of LBT.

As shown in FIG. 4, on a CG resource 401, after the MAC layer HARQ entity of the terminal equipment 102 triggers transmission of new data in the HARQ process, the process state of the HARQ process is set to be the NACK state. In the case of LBT failure of the physical layer, the new data of the HARQ are saved in an HARQ transmission buffer, and at this moment, the CG timer and CG retransmission timer are not started.

On a next CG resource 402, as the CG retransmission timer of the HARQ process is not running (not started) and the process state of the HARQ process is the NACK state, the terminal equipment 102 may initiate data retransmission of the HARQ, the LBT of the physical layer is successful, and the CG retransmission timer is started after the data transmission on the CG resource is completed; as this transport block is successfully transmitted for the first time, the terminal equipment 102 needs further to start the CG timer; and as previous transmission of the data has never been successful (due to failure of LBT), the UCI transmitted together with the data indicates that the data are new transport blocks of the HARQ process.

As shown in FIG. 4, the CG retransmission timer expires, the state of the HARQ process on a next CG resource 403 is NACK and the CG retransmission timer is not running (expires), and the terminal equipment may trigger retransmission of data; however, the CG retransmission timer is not started at this moment as data retransmission of the HARQ fails due to that failure of LBT. On a next CG resource 404, the retransmission data are successfully transmitted, and the CG retransmission timer is started.

As shown in FIG. 4, the CG timer expires, the terminal equipment sets the HARQ state to be the ACK state, and on a first CG resource 405 thereafter, the state of the HARQ process is ACK, hence, the terminal equipment may initiate new data transmission of the HARQ. Similar operations: on the CG resource 405, the MAC layer HARQ entity of the terminal equipment triggers transmission of new data in the HARQ process and sets the process state to be the NACK state, but the LBT of the physical layer fails in the transmission, the new HARQ data are stored in the HARQ transmission buffer, and at this moment, the CG timer and CG retransmission timer are not started; on a next CG resource 406, the CG retransmission timer of the HARQ process is not running (not started) and the state is the NACK state, hence, the terminal equipment may initiate data retransmission of the HARQ, the LBT of the physical layer is successful, and the CG retransmission timer is started after the data transmission is completed on the CG resource; as this transport block is successfully transmitted for the first time, the terminal equipment 102 needs further to start the CG timer; and as previous transmission of the data has never been successful (due to failure of LBT), the UCI transmitted together with the data indicates that the data are new transport blocks of the HARQ process.

Implementation 2

In this implementation, after the new HARQ process data are transmitted on the CG resource, the CG timer is started, thereby preventing a situation where after transmitting the new data on the CG resource, the terminal equipment is unable to transmit new data due to not receiving the downlink feedback information (DFI) transmitted by the network device. In this implementation, after the terminal equipment 102 transmits data on the uplink resource of the HARQ process dynamically scheduled by the network device 101, the CG timer is not started.

In this implementation, the terminal equipment 102 starts the CG retransmission timer after transmitting the new process data or retransmission data of the HARQ on the CG resource.

Operations of the terminal equipment 102 are as follows: for each CG resource appearing periodically, when the CG retransmission timer of the HARQ process is not running and the state of the HARQ process is NACK, the terminal equipment 102 transmits the retransmission data of the HARQ process on the CG resource, and starts the CG retransmission timer;

when the state of the HARQ process is ACK, the terminal equipment 102 transmits newly transmitted data of the HARQ process on the CG resource, sets the state of the process to be ACK, and starts the CG timer and the CG retransmission timer.

When the CG timer of the HARQ process expires, the terminal equipment 102 sets the state of the process to be ACK.

After the network device 101 receives the HARQ data transmitted by the terminal equipment 102 on the CG resource, it may transmit downlink feedback information to the terminal equipment 102, including HARQ-ACK or HARQ-NACK information, so as to indicate whether the HARQ data are correctly received by the network device 101.

If the terminal equipment 102 receives the HARQ-NACK, the terminal equipment 102 may stop the CG retransmission timer running in the HARQ process. Furthermore, the process state may also be set to be NACK; and if the terminal equipment 102 receives the HARQ-ACK, the terminal equipment 102 set the process state to be ACK and stops the CG timer running in the HARQ process.

Figure 5:
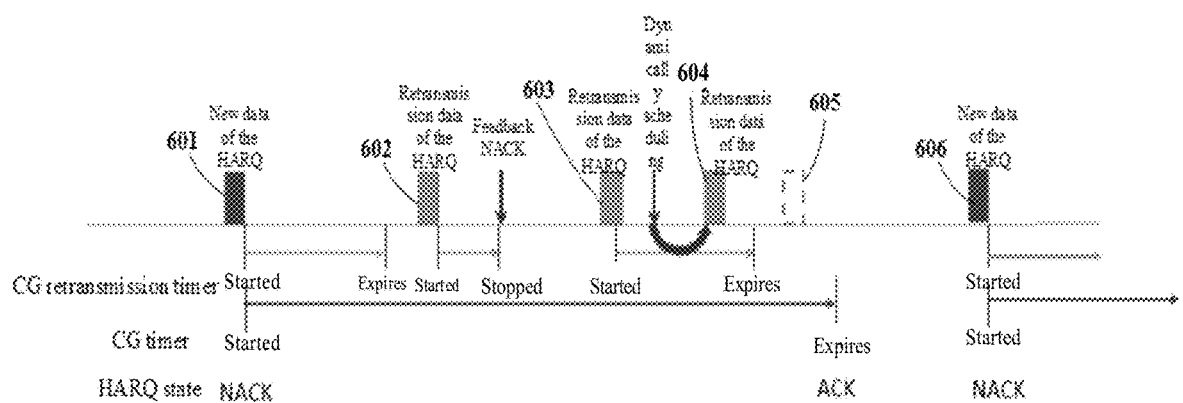
FIG. 5 is a schematic diagram of a timer and a process state of an HARQ process in Implementation 2 of the first aspect of the embodiments of this disclosure.

FIG. 5 is a schematic diagram of the timer and the process state of the HARQ process in Implementation 2 of the first aspect of the embodiments of this disclosure.

As shown in the figure, after the terminal equipment 102 transmits the new data of the HARQ process on a CG resource 601, the process state of the HARQ process is set to be the NACK state, and the CG timer and the CG retransmission timer are started.

On a first CG resource 602 after the new data are transmitted, the CG retransmission timer of the HARQ process is not running (expires) and the process state of the HARQ process is the NACK state, hence, the terminal equipment 102 may initiate HARQ data retransmission, and start the CG retransmission timer after the data retransmission. After transmitting the retransmission data, the terminal equipment 102 receives the HARQ-NACK feedback from the network device 101 for the retransmission data, and the terminal equipment 102 stops the CG retransmission timer (or may further set the HARQ state to be the NACK state).

On a second CG resource 603 after transmitting the new data, the CG retransmission timer of the HARQ process is not running (stopped) and the process state of the HARQ process is the NACK state, hence, the terminal equipment 102 may initiate HARQ data retransmission again and start the CG retransmission timer. After transmitting a second time of retransmission data on the CG resource 603, the terminal equipment 102 receives a dynamic scheduling command for the HARQ process transmitted by the network device 101, the dynamic scheduling command instructing the terminal equipment 102 to transmit the HARQ retransmission data on the uplink resource 604.

After transmitting the dynamically scheduled HARQ retransmission data on the resource 604, for the CG resource 605, although the CG retransmission timer is not running (expires) and the HARQ state is NACK, in order to avoid confusion of management of the HARQ process, the terminal equipment 102 is unable to transmit the retransmission data on the CG resource 605.

As shown in FIG. 5, after transmitting the dynamically scheduled HARQ retransmission data on the resource 604, the terminal equipment 102 does not receive the HARQ-ACK feedback transmitted by the network device 101 until the CG timer expires, and sets the HARQ process state to be ACK. On a first CG resource 606 after the CG timer expires, the terminal equipment 102 may initiate new data transmission, start the CG timer and the CG retransmission timer, and set the process state of the HARQ process to be NACK.

Implementation 3

In Implementation 3, after the terminal equipment 102 transmits the new data of the HARQ process on the CG resource, the CG timer is started, and when the terminal equipment 102 transmits the new data on the uplink resource of the HARQ process dynamically scheduled by the network device 101 or receives command from the network device 101 dynamically scheduling the new data of the HARQ process, the CG timer is also started. Thus, it may be prevented that the terminal equipment 102 is unable to transmit new data caused by the terminal equipment 102 not receiving the downlink feedback information (DFI) transmitted by the network device 101 after transmitting the new data on the CG resource, and it may also be prevented that the terminal equipment 102 is unable to transmit new data forever caused by the terminal equipment 102 not receiving ACK feedback transmitted by the network device 101 after the network device 101 dynamically schedules the CG HARQ process of the terminal equipment 102.

In this implementation, the terminal equipment 102 starts the CG retransmission timer after transmitting the new data or retransmission data of HARQ process on the CG resource.

In this implementation, the terminal equipment 102 may perform the following operations:

for each CG resource appearing periodically, when the CG retransmission timer of the HARQ process is not running and the state of the HARQ process is NACK, the terminal equipment 102 transmits the retransmission data of the HARQ process on the CG resource and starts the CG retransmission timer;

when the state of the HARQ process is ACK, the terminal equipment 102 transmits the newly transmitted data of the HARQ process on the CG resource, sets the state of the process to be NACK, and starts the CG timer and the CG retransmission timer; and when the CG timer of the HARQ process expires, the terminal equipment 102 sets the state of the process to be ACK.

After receiving the data of the HARQ transmitted by the terminal equipment 102 on the CG resource, the network device 101 may transmit downlink feedback information to the terminal equipment 102, the downlink feedback information including HARQ-ACK/HARQ-NACK information, so as to indicate whether the data of the HARQ are correctly received by the network device 101. If the terminal equipment 102 receives the HARQ-NACK, it may stop the CG retransmission timer running in the HARQ process, and furthermore, it may set the process state to be NACK; and if the terminal equipment 102 receives the HARQ-ACK, it may set the process state to be ACK and stops the CG timer running in the HARQ process.

Figure 6:
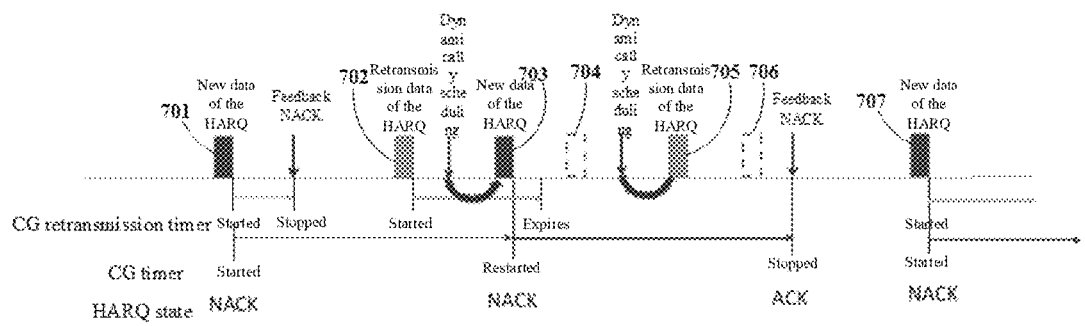
FIG. 6 is a schematic diagram of a timer and a process state of an HARQ process in Implementation 3 of the first aspect of the embodiments of this disclosure.

FIG. 6 is a schematic diagram of a timer and a process state of the HARQ process in Implementation 3 of the first aspect of the embodiments of this disclosure.

As shown in FIG. 6, after transmitting the new data of the HARQ process on a CG resource 701, the terminal equipment 102 sets the process state of the HARQ process to be the NACK state, and starts the CG timer and the CG retransmission timer.

The terminal equipment 102 receives the HARQ-NACK feedback from the network device 101 for the retransmission data, and stops the CG retransmission timer, and may further set the HARQ state to be the NACK state.

As shown in FIG. 6, on a first CG resource 702 after transmitting the new data, the CG retransmission timer of the HARQ process is not running (stopped) and the process state of the HARQ process is the NACK state, hence, the terminal equipment 102 may initiate data retransmitted of the HARQ, and start the CG retransmission timer after the data retransmission. And on a CG resource 702 shown in FIG. 6, even if the CG timer is in a running state, the retransmission data may still be transmitted.

After transmitting the retransmission data on the CG resource 702, the terminal equipment 102 receives the dynamic scheduling command for the HARQ process transmitted by the network device 101, instructing the terminal equipment 102 to transmit new data of the HARQ. And the terminal equipment 102 restarts the CG timer after transmitting the dynamically scheduled new data on the uplink resource 703.

As shown in FIG. 6, the terminal equipment 102 does not start the CG retransmission timer after transmitting the dynamically scheduled new data on the uplink resource 703. As shown in FIG. 6, the terminal equipment 102 does not stop the CG retransmission timer after transmitting the dynamically scheduled new data on the uplink resource 703. However, this implementation may not be limited thereto; for example, the terminal equipment 102 may stop the CG retransmission timer after transmitting the dynamically scheduled new data on the uplink resource 703.

Furthermore, as shown in FIG. 6, after transmitting the dynamically scheduled new data on the uplink resource 703, the terminal equipment 102 receives the dynamic scheduling command for the HARQ process transmitted by the network device 101, instructing the terminal equipment 102 to transmit the retransmission data of the HARQ. And the terminal equipment 102 transmits the dynamically scheduled retransmission data on the uplink resource 705.

On two CG resources 704 and 706 after transmitting the dynamically scheduled new data of the HARQ, although the CG retransmission timer is not running (expires) and the process state of the HARQ process is NACK, in order to avoid confusion of management of the HARQ process, the terminal equipment 102 is unable to transmit retransmission data. When the terminal equipment 102 receives the HARQ- ACK feedback transmitted by the network device 101, it sets the state of the HARQ process to be ACK and stops the CG timer of the HARQ process.

On a first CG resource 707 after the process state is set to be ACK, the terminal equipment 102 may initiate transmission of new data, start the CG timer and the CG retransmission timer, and set the process state of the HARQ process to be NACK.

Figure 7:
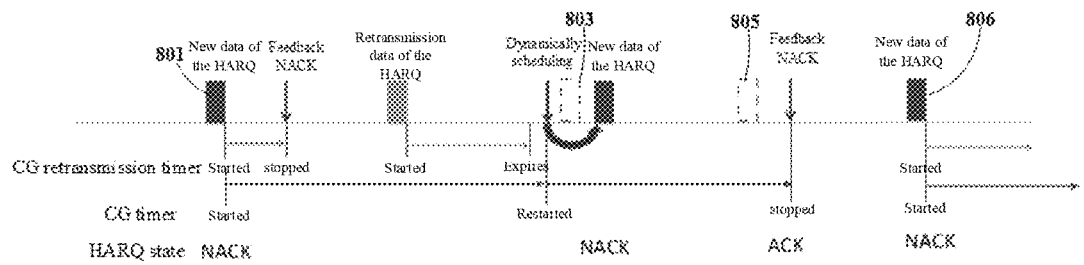
FIG. 7 is another schematic diagram of the timer and the process state of the HARQ process in Implementation 3 of the first aspect of the embodiments of this disclosure.

FIG. 7 is another schematic diagram of the timer and the process state of the HARQ process in Implementation 3 of the first aspect of the embodiments of this disclosure.

As shown in FIG. 7, in order to avoid conflict between the HARQ transmission of CG and the HARQ scheduled by the network device 101, the terminal equipment 102 is unable to transmit the retransmission data of the HARQ process indicated by the dynamic scheduling after receiving the dynamic scheduling command from the network device 101, such as not transmitting the retransmission data of the HARQ process indicated by the dynamic scheduling on CG resources 803 and 805.

As shown in FIG. 7, when the terminal equipment 102 receives a command from the network device 101 dynamically scheduling new data of the HARQ process, it starts the CG timer to prevent the terminal equipment 102 from transmitting the retransmission data on CG resources between the dynamic scheduling commanded uplink resource and the dynamically scheduled uplink resource.

As shown in FIG. 7, for each CG resource appearing periodically, only when the CG retransmission timer of the HARQ process is not running, the CG timer is not running and the dynamic scheduling command of the network device 101 is not received, the terminal equipment 102 may transmit the retransmission data or new data of the HARQ process on the CG resources (such as CG resources 801 and 806).

Implementation 4

In Implementation 4, after the terminal equipment 102 transmits the new data of the HARQ process on the CG resource, it starts the CG timer, and when the terminal equipment 102 transmits the data (including the new data and retransmission data) on the uplink resource of the HARQ process dynamically scheduled by the network device 101 or receives a command from the network device 101 dynamically scheduling the data (including new data and retransmission data) of HARQ process, it also starts the CG timer.

Thus, it may be prevented that the terminal equipment 102 is unable to transmit new data caused by the terminal equipment 102 not receiving the downlink feedback information (DFI) transmitted by the network device 101 after transmitting the new data on the CG resource, and it may also be prevented that the terminal equipment 102 is unable to transmit new data forever caused by the terminal equipment 102 not receiving ACK feedback transmitted by the network device 101 after the network device 101 dynamically schedules the CG HARQ process of the terminal equipment 102. And furthermore, for each dynamically scheduled transmission, the terminal equipment 102 may have identical maximum ACK feedback waiting times, and support the network device to actively schedule retransmissions multiple times.

In this implementation, in order to avoid conflict between the HARQ transmission of CG and the HARQ scheduled by the network device 101, the terminal equipment 102 is unable to transmit the retransmission data of the HARQ process indicated by the dynamic scheduling after receiving the dynamic scheduling command from the network device 101. When the terminal equipment 102 transmits the data (including the new data and retransmission data) on the uplink resource of the HARQ process dynamically scheduled by the network device 101 or receives a command from the network device 101 dynamically scheduling the data (including new data and retransmission data) of HARQ process, it starts the CG timer, so as to prevent the terminal equipment 102 from transmitting the retransmission data on the CG resource between the dynamic scheduling command and the dynamically scheduled uplink resource. For each CG resource appearing periodically, only when the CG retransmission timer of the HARQ process is not running, the CG timer is not running and the dynamic scheduling command of the network device 101 is not received, the terminal equipment 102 may transmit the retransmission data of the HARQ process on the CG resources.

Figure 8:
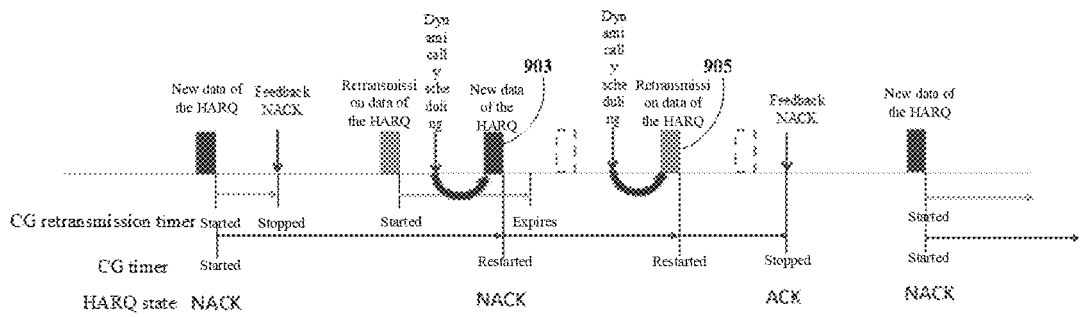
FIG. 8 is a schematic diagram of a timer and a process state of an HARQ process in Implementation 4 of the first aspect of the embodiments of this disclosure.

FIG. 8 is a schematic diagram of a timer and a process state of an HARQ process in Implementation 4 of the first aspect of the embodiments of this disclosure.

A difference between FIG. 8 and FIG. 6 exists in that in FIG. 6, the terminal equipment 102 does not start the CG timer after transmitting the retransmission data on the uplink resource 705 of the HARQ process dynamically scheduled by the network device 101, while in FIG. 8, the terminal equipment 102 starts the CG timer after transmitting the retransmission data on an uplink resource 905 of the HARQ process dynamically scheduled by the network device 101. Furthermore, in FIG. 6 and FIG. 8, the terminal equipment 102 starts the CG timer after transmitting new data on the uplink resource 703 or 903 of the HARQ process dynamically scheduled by the network device 101.

Figure 9:
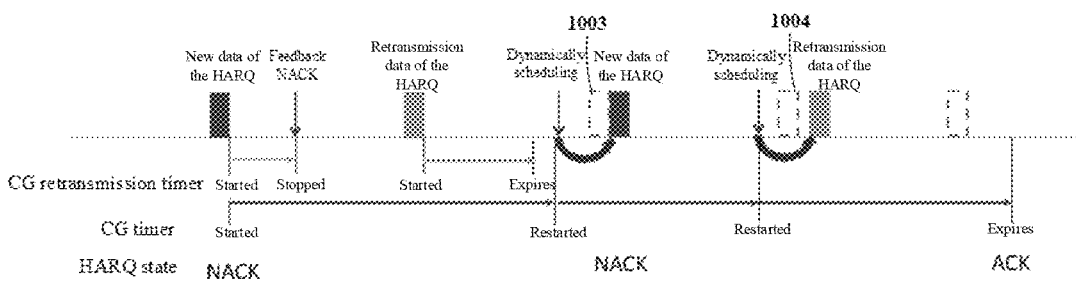
FIG. 9 is another schematic diagram of the timer and the process state of the HARQ process in Implementation 4 of the first aspect of the embodiments of this disclosure.

FIG. 9 is another schematic diagram of the timer and the process state of the HARQ process in Implementation 4 of the first aspect of the embodiments of this disclosure.

What is identical between FIG. 9 and FIG. 7 exists that when the terminal equipment 102 receives a command from the network device 101 dynamically scheduling newly transmitted data of the HARQ process, it starts the CG timer. For example, in FIG. 7, when the command of the network device 101 dynamically scheduling newly transmitted data of the HARQ process is received shown before the CG resource 803, the CG timer is started; and in FIG. 9, when the command of the network device 101 dynamically scheduling newly transmitted data of the HARQ process is received shown before a CG resource 1003, the CG timer is started.

Furthermore, in FIG. 9, the terminal equipment 102 starts the CG timer when it receives a command from the network device 101 dynamically scheduling the retransmission data of the HARQ process (for example, before a CG resource 1004 in FIG. 9).

Second Aspect of the Embodiments

The second aspect of the embodiments of this disclosure relates to a data transmission method, applicable to a terminal equipment, such as a terminal equipment 102.

Figure 10:
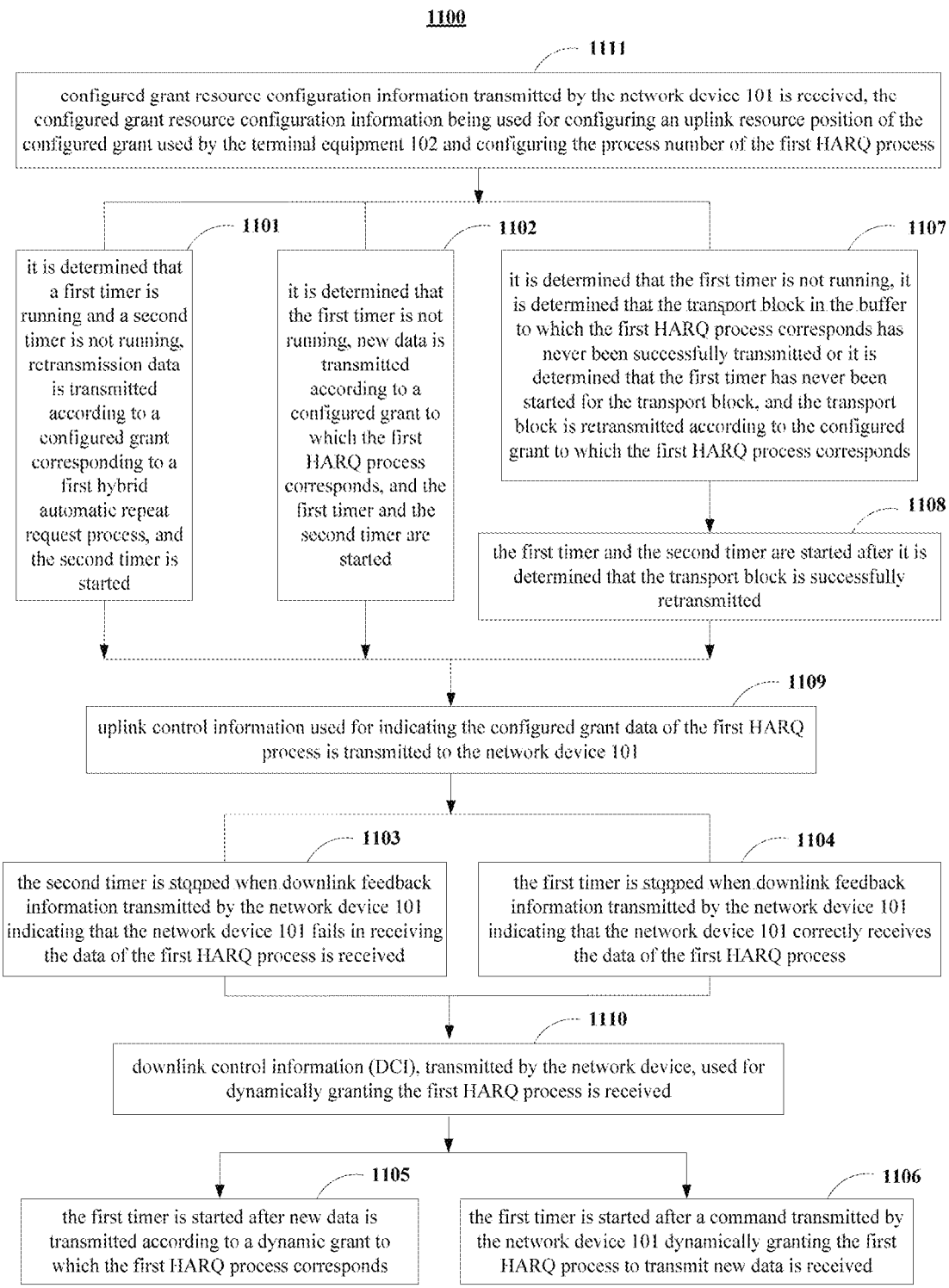
FIG. 10 is a schematic diagram of the data transmission method of the second aspect of the embodiments of this disclosure.

FIG. 10 is a schematic diagram of the data transmission method of the second aspect of the embodiments of this disclosure. As shown in FIG. 10, the data transmission method 1100 may include at least of the following operation 1101 and operation 1102:

operation 1101: it is determined that a first timer is running and a second timer is not running, retransmission data is transmitted according to a configured grant corresponding to a first hybrid automatic repeat request (HARQ) process, and the second timer is started; and operation 1102: it is determined that the first timer is not running, new data is transmitted according to a configured grant to which the first HARQ process corresponds, and the first timer and the second timer are started.

According to the second aspect of the embodiments of this disclosure, in operation 1101 or operation 1102, new data or retransmission data are transmitted on a configured grant (CG) resource according to running states of the two timers, thereby using uplink resources of the configured grant to transmit the retransmission data, and improving efficiency of data transmission; and furthermore, a problem that the terminal equipment is hard to determine whether to transmit new data or retransmit data on CG resources may be avoided.

In the second aspect of the embodiments of this disclosure, the first timer may be a configured grant (CG) timer, and the second timer may be a configured grant (CG) retransmission timer.

In the second aspect of the embodiments of this disclosure, the first HARQ process is an HARQ process configured by a network device for the terminal equipment in which uplink configured grant transmission may be performed; the first HARQ process may correspond to the first timer and the second timer, for example, each first HARQ process may maintain a first timer and a second timer.

In at least one embodiment, in operation 1101, that the first timer is not running includes that the first timer is not started, and the first timer is stopped after it expires, or the terminal equipment 102 makes the first timer stopped when the terminal equipment receives downlink feedback information to which the first HARQ corresponds transmitted by the network device 101.

In at least one embodiment, in operation 1102, that the second timer is not running includes that the second timer is not started, and the second timer is stopped after it expires, or the terminal equipment 102 makes the second timer stopped when the terminal equipment receives downlink feedback information to which the first HARQ corresponds transmitted by the network device 101.

In at least one embodiment, a length of the second timer may be less than a length of the first timer. Hence, a situation where retransmission data of the HARQ process are unable to be transmitted forever may be avoided.

In at least one embodiment, in operation 1101, the transmitting retransmission data according to a configured grant corresponding to a first HARQ process may be, for example, determining that there exists a transport block in a buffer of the first HARQ process, and transmitting the transport block in the buffer of the first HARQ process. And furthermore, the transmitting retransmission data may be performed when a state of a new data indication (NDI) of the first HARQ process is not inversed.

In at least one embodiment, the transmitting retransmission data according to a configured grant corresponding to a first HARQ process, and starting the second timer in operation 1101 may be, for example, transmitting the retransmission data, determining that the retransmission data are successfully transmitted, and starting the second timer.

In at least one embodiment, in operation 1102, the operation transmitting new data according to the configured grant to which the first HARQ process corresponds may be, for example, determining that a transport block in a buffer to which the first HARQ process corresponds has been successfully transmitted or determining that the first timer has been started for the transport block, determining a state indicated by the new data of the first HARQ process as being inversed, generating a new data transport block in a media access control (MAC) layer, and transmitting the new data transport block.

In at least one embodiment, in operation 1102, the operation of starting the second timer and starting the first timer may be, for example, determining that the new data transport block is successfully transmitted, and then starting the second timer and starting the first timer.

In at least one embodiment, in addition to transmitting, by the terminal equipment 102, the HARQ data of CG transmission on the CG resource, the network device 101 may actively schedule the new data or retransmission data of the CG HARQ process, that is, the terminal equipment may transmit the data of the CG HARQ process on the uplink resource dynamically scheduled by the network device.

In order to avoid confusion in management of an HARQ process caused by the terminal equipment 102 transmitting data of the HARQ process on the CG resource while the network device 101 dynamically scheduling the same CG HARQ process, in at least one embodiment, after the network device 101 dynamically schedules the CG HARQ process, the terminal equipment 102 is unable to transmit the data of the HARQ process on the CG resource, and is unable to transmit the new data of the HARQ process on the CG resource, that is, on the premise that it is determined that no data is transmitted at a dynamic grant to which the HARQ process corresponds and no command transmitted by the network device 101 is received dynamically granting the HARQ process to transmit data, the terminal equipment 102 may transmit the new data or the retransmission data on the CG resource to which the HARQ process corresponds. Thus, after the network device 101 dynamically schedules the CG HARQ process, the terminal equipment 102 does not a CG retransmission timer of the HARQ.

For example, in operation 1102 and operation 1101, the new data or retransmission data are transmitted according to the configured grant to which the first HARQ process corresponds on the premise that: it is determined that there exists no data is transmitted at a dynamic grant to which the first HARQ process corresponds, and a command transmitted by the network device 101 dynamically granting the first HARQ process to transmit data is not received.

In at least one embodiment, as shown in FIG. 10, the data transmission method 1100 further includes:

operation 1103: the second timer is stopped when downlink feedback information (DFI) transmitted by the network device 101 indicating that the network device 101 fails in receiving the data of the first HARQ process is received; or operation 1104: the first timer is stopped when downlink feedback information (DFI) transmitted by the network device 101 indicating that the network device 101 correctly receives the data of the first HARQ process.

In operation 1103, when the DFI indicates that the network device 101 fails in receiving the data of the first HARQ process, the DFI may be, for example, HARQ-NACK information.

In operation 1104, when the DFI indicates that the network device 101 correctly receives the data of the first HARQ process, the DFI may be, for example, HARQ-ACK information.

With the above operation 1103 or operation 1104, the terminal equipment 102 may stop a corresponding timer in time according to the downlink feedback information transmitted by the network device 102, thus, retransmission or new transmission of the data may be performed before the first timer or the second timer expire, thereby lowering latency of data transmission.

In at least one embodiment, as shown in FIG. 10, the data transmission method 1100 may further include one of the following operations 1105 and 1106:

operation 1105: the first timer is started after new data is transmitted according to a dynamic grant to which the first HARQ process corresponds; and operation 1106: the first timer is started after a command transmitted by the network device 101 dynamically granting the first HARQ process to transmit new data is received.

According to operation 1105 or operation 1106, when the network device dynamically schedules the CG HARQ process to transmit new data, the first timer may also be started at an appropriate time.

In at least one embodiment, in operation 1105, the step of starting the first timer after transmitting new data according to a dynamic grant to which the first HARQ process corresponds may include, for example, transmitting new data according to the dynamic grant to which the first HARQ process corresponds, and starting the first timer when it is determined that the new data are successfully transmitted.

In at least one embodiment, as shown in FIG. 10, the data transmission method 1100 further includes:

operation 1107: it is determined that the first timer is not running, it is determined that the transport block in the buffer to which the first HARQ process corresponds has never been successfully transmitted or it is determined that the first timer has never been started for the transport block, and the transport block is retransmitted according to the configured grant to which the first HARQ process corresponds.

In operation 1107, it may further be determined that a new data indication (NDI) of the first HARQ process has not been inversed. For example, when it is determined that the first timer is not running, it is determined that the transport block in the buffer to which the first HARQ process corresponds has never successfully transmitted or it is determine that the first timer has never been started for the transport block, and it is determined that the new data indication (NDI) of the first HARQ process is not inversed, the transport block is retransmitted according to the configured grant to which the first HARQ process corresponds.

According to operation 1107, the transport block in the buffer to which the first HARQ process corresponds may be retransmitted.

In at least one embodiment, as shown in FIG. 10, the data transmission method 1100 further includes:

operation 1108: when the transport block is retransmitted according to the configured grant to which the first HARQ process corresponds, the first timer and the second timer are started after it is determined that the transport block is successfully retransmitted.

In at least one embodiment, as shown in FIG. 10, the data transmission method 1100 may further include:

operation 1109: uplink control information (UCI) used for indicating the configured grant information of the first HARQ process is transmitted to the network device 101.

In operation 1109, the uplink control information (UCI) may include: a network identifier of the terminal equipment 102, such as a cell-radio network temporary identifier (C-RNTI) of the terminal equipment 102 or a configured scheduling-radio network temporary identifier (CS-RNTI), wherein the C-RNTI or CS-RNTI may be of 16 bits.

In at least one embodiment, configured grant data that are the new data or retransmission data of the first HARQ process may be indicated by the network identifier of the terminal equipment 102 in the uplink control information (UCI) to the network device 101; for example, the C-RNTI of the terminal equipment 102 may be used to indicate the new data of the first HARQ process, and the CS-RNTI of the terminal equipment 102 may be used to indicate the retransmission data of the first HARQ process.

In operation 1109, the uplink control information (UCI) may further include: information of the new data indication (NDI) of the first HARQ process.

In at least one embodiment, the information of the new data indication (NDI) of the first HARQ process in the uplink control information may indicate that the configured grant data are the new data or retransmission data of the first HARQ process; for example, if the new data indication (NDI) is identical to new data indication (NDI) of a last HARQ process, that is, the new data indication (NDI) is not inversed, which indicates that the configured grant data are the retransmission data of the first HARQ process; and if the new data indication (NDI) is different from the new data indication (NDI) of the last HARQ process, that is, the new data indication (NDI) is inversed, which indicates that the configured grant data are the new data of the first HARQ process.

In at least one embodiment, the uplink control information (UCI) in operation 1109 may further include: a process identifier of the first HARQ process, such as a process number (HARQ ID) of the first HARQ process, and redundancy version (RV) information of a transport block of the first HARQ process.

In at least one embodiment, in operation 1109, when the configured grant data of the first HARQ process have never been successfully transmitted, the UCI indicates that the configured grant data are new data; otherwise, the UCI indicates that the configured grant data are retransmission data.

In at least one embodiment, as shown in FIG. 10, the data transmission method 1100 further includes:

operation 1110: downlink control information (DCI), transmitted by the network device, used for dynamically granting the first HARQ process is received.

In operation 1110, the downlink control information (DCI) includes a process number (HARQ ID) of the first HARQ process and redundancy version (RV) information of the first HARQ process transport block; wherein the downlink control information (DCI) may be scrambled by the network identifier of the terminal equipment 102, the network identifier of the terminal equipment 102 being, for example, a C-RNTI or a CS-RNTI.

In at least one embodiment, the network identifier of the terminal equipment 102 in the downlink control information (DCI) may be used to indicate that the data of the dynamic grant are new data or retransmission data of the first HARQ process. For example, the C-RNTI of the terminal equipment 102 may be used to indicate the new data of the first HARQ process, and the CS-RNTI of the terminal equipment 102 may be used to indicate the retransmission data of the first HARQ process.

In at least one embodiment, the downlink control information (DCI) further includes new data indication (NDI) information of the first HARQ process. The new data indication information in the downlink control information (DCI) is used to indicate that the dynamic grant data of the terminal equipment 102 are the new data or retransmission data of the first HARQ process; for example, if the new data indication (NDI) in the downlink control information (DCI) is identical to new data indication (NDI) of a last HARQ process, that is, the new data indication (NDI) is not inversed, which indicated that the dynamic grant data are the retransmission data of the first HARQ process, and if the new data indication (NDI)) is different from the new data indication (NDI) of the last HARQ process, that is, the new data indication (NDI) is inversed, which indicates that the dynamic grant data are the new data of the first HARQ process.

In at least one embodiment, as shown in FIG. 10, the data transmission method 1100 further includes:

operation 1111: configured grant resource configuration information transmitted by the network device 101 is received, the configured grant resource configuration information being used for configuring an uplink resource position of the configured grant used by the terminal equipment 102 and configuring the process number of the first HARQ process.

In operation 1111, the CG resource configuration information may include: a period of an uplink resource of configured grant, a duration of the uplink resource of configured grant, and an offset of the uplink resource of configured grant in the period. For example, the period, duration and offset are in units of orthogonal frequency division multiplexing (OFDM) symbols, slots, or subframes.

The terminal equipment 102 may transmit data on CG (configured grant) uplink resources that appear periodically without receiving PDCCH signaling transmitted by the network device 101 in advance. For example, in operation 1102 or operation 1101, the terminal equipment may transmit new data or retransmit data on an uplink resource of configured grant to which the first HARQ process corresponds.

According to the second aspect of the embodiments of this disclosure, in operation 1101 or operation 1102, the new data or retransmission data are transmitted on the configured grant (CG) resource according to the state of the timer. Thus, the configured grant uplink resource may be used to transmit the retransmission data, thereby improving efficiency of data transmission; furthermore, a problem that the terminal equipment is hard to determine whether to transmit new data or retransmit data on CG resources may be avoided.

Furthermore, according to the second aspect of the embodiments of this disclosure, in a case where the terminal equipment 102 operates on an unlicensed frequency band, if a physical layer is successful in performing Listen Before Talk (LBT), the terminal equipment 102 may transmit data, and if the physical layer fails in performing LBT, the terminal equipment 102 is unable to transmit data. In the case of failure of LBT, although an MAC layer of the terminal equipment 102 has generated the data of the first HARQ process, the data of the first HARQ process still exist in the HARQ data buffer.

In the case of failure of LBT of the physical layer, as data are not actually transmitted, neither the first timer nor the second timer is started; after the MAC layer HARQ process of the terminal equipment 102 requests to transmit new data or retransmission data on the CG resource, the second timer is started only when the LBT of the physical layer is successful (that is, after the data are transmitted successfully).

Furthermore, in a case where the first time is not running and it is determined that the transport block in the buffer to the first HARQ process corresponds has never been transmitted successfully (that is, LBT fails) or the first time is not started for the transport block, the transport block is retransmitted according the configured grant to which the first HARQ process corresponds, and the first timer and the second timer are started after the transmission is successful.

It should be noted that FIG. 10 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 10.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

The second aspect of the embodiments of this disclosure shall be exemplarily described below by way of examples.

In the following specific implementations, the HARQ process is the first HARQ process, and each HARQ process maintains a first timer and a second timer; wherein the first timer is, for example, a CG timer, and the second timer is, for example, a CG retransmission timer, the first state of the HARQ process is a NACK state, and the second state of the HARQ process is an ACK state.

Implementation 1

In this implementation, after the new HARQ process data are transmitted on the CG resource, the CG timer and the CG retransmission timer are started, thereby preventing a situation where after transmitting the new data on the CG resource, the terminal equipment is unable to transmit new data due to not receiving the downlink feedback information (DFI) transmitted by the network device.

After transmitting the new data or retransmission data of the HARQ process on the CG resource, the terminal equipment 101 starts the CG retransmission timer.

The UCI transmitted together with the data on the CG resource may indicate the HARQ process information to the network device 101. The UCI includes the HARQ process identifier, the network identifier of the terminal equipment, and the redundancy version (RV) information of the HARQ process transport block, and the UCI may be used to indicate to the network device 101 whether the data are new data or retransmission data of the HARQ process.

Figure 11:
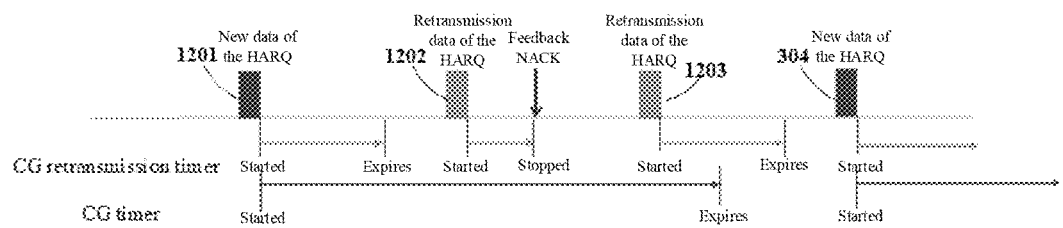
FIG. 11 is a schematic diagram of a process state of a timer and HARQ process in Implementation 1 of the second aspect of the embodiments of this disclosure.

FIG. 11 is a schematic diagram of the timer and the process state of the HARQ process in Implementation 1 of the second aspect of the embodiments of this disclosure.

As shown in FIG. 11, after the terminal equipment 102 transmits the new data of the HARQ process on a CG resource 1201, it starts the CG timer and the CG retransmission timer. On a first CG resource 1202 after the new data are transmitted, the CG retransmission timer of the HARQ process is not running (expires) and the CG timer is running, hence, the terminal equipment may initiate data retransmission of the HARQ, and start the CG retransmission timer after retransmission of data.

As shown in FIG. 11, after transmitting the retransmission data, the terminal equipment 102 receives HARQ-NACK feedback transmitted by the network device 101 for the retransmission data, and the terminal equipment stops the CG retransmission timer. On a second CG resource 1203 after the new data are transmitted, the CG retransmission timer of the HARQ process is not running (stopped) and the CG timer is running, hence, the terminal equipment may initiate data retransmission of the HARQ again and start the CG retransmission timer. After the second time of transmitting retransmission data, the CG timer expires.

As shown in FIG. 11, on a third CG resource 1204 after transmitting the new data, the CG timer is not running (expires), hence, the terminal equipment may initiate new data transmission of the HARQ.

In this implementation, if the transmission of the data of the HARQ on the CG resource fails (for example, the LBT fails), the data of the HARQ are continued to be transmitted on a next CG resource, and UCI transmitted together with the data may be identical to or different from UCI transmitted together with data last time when LBT fails, such as an RV identical to or different from that of the last time of data transmission. If a transport block has never been successfully transmitted, the UCI transmitted together with the transport block indicates that the transport block is new data. After a transport block is successfully transmitted, the CG retransmission timer is started; and if it is a first time of successfully transmitting a transport block, the CG timer is started in addition to starting the CG retransmission timer.

Figure 12:
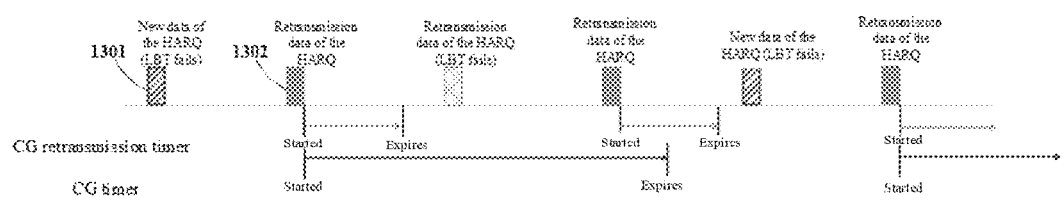
FIG. 12 is another schematic diagram of the process state of a timer and HARQ process in Implementation 1 of the second aspect of the embodiments of this disclosure.

FIG. 12 is another schematic diagram of the timer and the process state of the HARQ process in Implementation 1 of the second aspect of the embodiments of this disclosure.

As shown in FIG. 12, on a CG resource 1301, after the MAC layer HARQ entity of the terminal equipment 102 triggers transmission of new data in the HARQ process, but the LBT of the physical layer fails, the new data of the HARQ are saved in an HARQ transmission buffer, and at this moment, the CG timer and CG retransmission timer are not started.

On a next CG resource 1302, it is determined that the CG time is not running and the transport block in the buffer to which the first HARQ process corresponds (e.g. an HARQ transmission buffer) has never been transmitted successfully or the CG timer has never been started for the transport block, and in a case where it is determined that the new data indication (NDI) of the first HARQ process is not inversed, the terminal equipment 102 may initiate HARQ data retransmission, and the LBT of the physical layer is successful. Thus, the transport block is retransmitted on the CG resource 1302. The CG retransmission timer is started, and as it is a first time of successfully transmitting the data block, the terminal equipment 102 starts the CG timer at the same time. And as transmission before this time of LBT has never been successful (LBT failed), in this time of LBT, the UCI transmitted together with the transport block indicates that the data transmitted are new transport blocks of the HARQ process.

Implementation 2

In this implementation, after the new HARQ process data are transmitted on the CG resource, the CG timer and the CG retransmission timer started, thereby preventing a situation where after transmitting the new data on the CG resource, the terminal equipment is unable to transmit new data due to not receiving the downlink feedback information (DFI) transmitted by the network device. In this implementation, after the terminal equipment 102 transmits data on the uplink resource of the HARQ process dynamically scheduled by the network device 101, the CG timer is not started.

In this implementation, the terminal equipment 102 starts the CG retransmission timer after transmitting the new data or retransmission data of the HARQ process on the CG resource.

Figure 13:
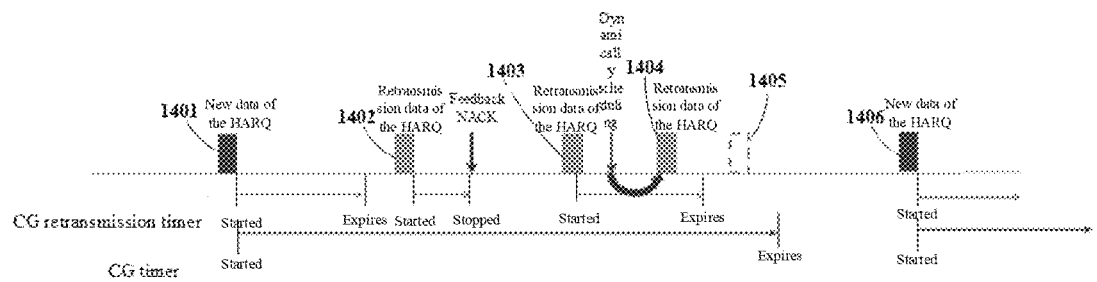
FIG. 13 is a schematic diagram of a process state of a timer and HARQ process in Implementation 2 of the second aspect of the embodiments of this disclosure.

FIG. 13 is a schematic diagram of the timer and the process state of the HARQ process in Implementation 2 of the second aspect of the embodiments of this disclosure.

As shown in FIG. 13, after the terminal equipment 102 transmits the new data of the HARQ process on a CG resource 1401, the CG timer and the CG retransmission timer are started. On a first CG resource 1402 after the new data are transmitted, the CG retransmission timer of the HARQ process is not running (expires) and the CG timer is running, hence, the terminal equipment 102 may initiate HARQ data retransmission, and start the CG retransmission timer after the data retransmission.

On a second CG resource 1403 after transmitting the new data, the CG retransmission timer of the HARQ process is not running (stopped) and the CG timer is running, hence, the terminal equipment 102 may initiate HARQ data retransmission, and start the CG retransmission timer after retransmitting on the CG resource 1403.

After transmitting the retransmission data on the resource 1403, the terminal equipment 102 receives a dynamic scheduling command transmitted by the network device 101 for the HARQ process, the dynamic scheduling command instructing the terminal equipment 102 to transmit the retransmission data of the HARQ on a resource 1404.

After transmitting the dynamically scheduled retransmission data of the HARQ on the resource 1404, for a CG resource 1405, although the CG retransmission timer is not running (stopped) and the CG timer is running, in order to avoid confusion of management of the HARQ process, the terminal equipment 102 is unable to transmit the retransmission data on the CG resource 1405.

As shown in FIG. 13, after transmitting the dynamically scheduled HARQ retransmission data on the resource 1404, the terminal equipment 102 does not receive the HARQ-ACK feedback transmitted by the network device 101 until the CG timer expires. On a first CG resource 1406 after the CG timer expires, the CG timer is not running, and the terminal equipment 102 may initiate new data transmission, and start the CG timer and the CG retransmission timer.

Implementation 3

In Implementation 3, after the terminal equipment 102 transmits the new data of the HARQ process on the CG resource, the CG timer and the CG retransmission timer are started, and when the terminal equipment 102 transmits the new data on the uplink resource of the HARQ process dynamically scheduled by the network device 101 or receives command from the network device 101 dynamically scheduling the new data of the HARQ process, the CG timer is also started. Thus, it may be prevented that the terminal equipment 102 is unable to transmit new data caused by the terminal equipment 102 not receiving the downlink feedback information (DFI) transmitted by the network device 101 after transmitting the new data on the CG resource, and it may also be prevented that the terminal equipment 102 is unable to transmit new data forever caused by the terminal equipment 102 not receiving ACK feedback transmitted by the network device 101 after the network device 101 dynamically schedules the CG HARQ process of the terminal equipment 102.

In this implementation, the terminal equipment 102 starts the CG retransmission timer after transmitting the new data or retransmission data of HARQ process on the CG resource.

Figure 14:
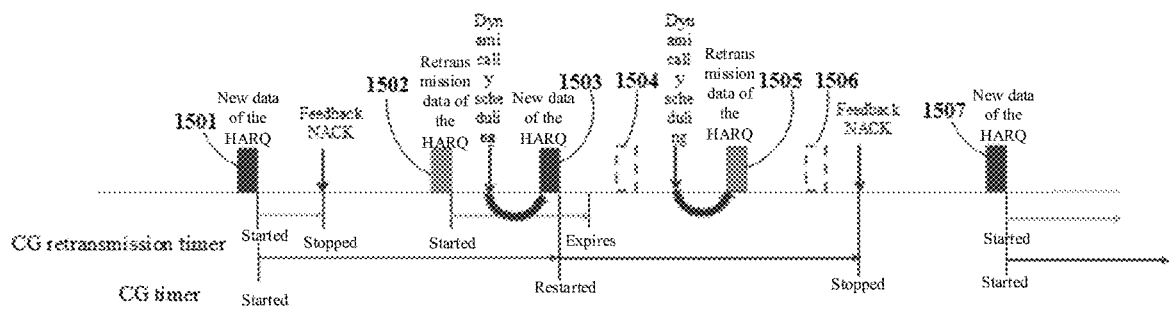
FIG. 14 is a schematic diagram of a process state of a timer and HARQ process in Implementation 3 of the second aspect of the embodiments of this disclosure.

FIG. 14 is a schematic diagram of a timer and a process state of the HARQ process in Implementation 3 of the second aspect of the embodiments of this disclosure.

As shown in FIG. 14, after transmitting the new data of the HARQ process on a CG resource 701, the terminal equipment 102 starts the CG timer and the CG retransmission timer.

The terminal equipment 102 receives the HARQ-NACK feedback from the network device 101 for the retransmission data, and stops the CG retransmission time.

As shown in FIG. 14, on a first CG resource 1502 after transmitting the new data, the CG retransmission timer of the HARQ process is not running (stopped) and the CG timer is running, hence, the terminal equipment 102 may initiate data retransmitted of the HARQ, and start the CG retransmission timer after the data retransmission.

After transmitting the retransmission data on the CG resource 1502, the terminal equipment 102 receives the dynamic scheduling command for the HARQ process transmitted by the network device 101, instructing the terminal equipment 102 to transmit new data of the HARQ. And the terminal equipment 102 restarts the CG timer after transmitting the dynamically scheduled new data on the uplink resource 1503.

As shown in FIG. 14, the terminal equipment 102 does not start the CG retransmission timer after transmitting the dynamically scheduled new data on the uplink resource 1503. As shown in FIG. 14, the terminal equipment 102 does not stop the CG retransmission timer after transmitting the dynamically scheduled new data on the uplink resource 1503. However, this implementation may not be limited thereto; for example, the terminal equipment 102 may stop the CG retransmission timer after transmitting the dynamically scheduled new data on the uplink resource 1503.

Furthermore, as shown in FIG. 14, after transmitting the dynamically scheduled new data on the uplink resource 1503, the terminal equipment 102 receives the dynamic scheduling command for the HARQ process transmitted by the network device 101, instructing the terminal equipment 102 to transmit the retransmission data of the HARQ. And the terminal equipment 102 transmits the dynamically scheduled retransmission data on the uplink resource 1505.

On two CG resources 1504 and 1506 after transmitting the dynamically scheduled new data of the HARQ, although the CG retransmission timer is not running (expires) and the CG timer is running, in order to avoid confusion of management of the HARQ process, the terminal equipment 102 is unable to transmit retransmission data. When the terminal equipment 102 receives the HARQ-ACK feedback transmitted by the network device 101, it sets the state of the HARQ process to be ACK and stops the CG timer of the HARQ process.

On a first CG resource 1507 after the process state is set to be ACK, as the CG timer is not running (stopped), the terminal equipment 102 may initiate transmission of new data, and start the CG timer and the CG retransmission timer.

Figure 15:
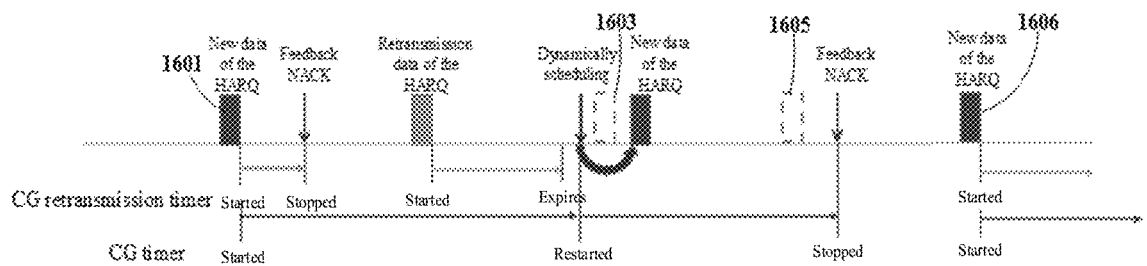
FIG. 15 is another schematic diagram of the process state of a timer and HARQ process in Implementation 3 of the second aspect of the embodiments of this disclosure.

FIG. 15 is another schematic diagram of the timer and the process state of the HARQ process in Implementation 3 of the second aspect of the embodiments of this disclosure.

As shown in FIG. 15, in order to avoid conflict between the HARQ transmission of CG and the HARQ scheduled by the network device 101, the terminal equipment 102 is unable to transmit the retransmission data of the HARQ process indicated by the dynamic scheduling after receiving the dynamic scheduling command from the network device 101, such as not transmitting the retransmission data of the HARQ process indicated by the dynamic scheduling on CG resources 1603 and 1605.

As shown in FIG. 15, when the terminal equipment 102 receives a command from the network device 101 dynamically scheduling new data of the HARQ process, it starts the CG timer to prevent the terminal equipment 102 from transmitting the retransmission data on CG resources between the dynamic scheduling commanded uplink resource and the dynamically scheduled uplink resource.

As shown in FIG. 15, for each CG resource appearing periodically, only when the CG timer of the HARQ process is not running and the dynamic scheduling command of the network device 101 is not received, the terminal equipment 102 may transmit the new data of the HARQ process on the CG resources (such as CG resources 1601 and 1606).

Implementation 4

In Implementation 4, after the terminal equipment 102 transmits the new data of the HARQ process on the CG resource, it starts the CG timer and the CG retransmission timer, and when the terminal equipment 102 transmits the data (including the new data and retransmission data) on the uplink resource of the HARQ process dynamically scheduled by the network device 101 or receives a command from the network device 101 dynamically scheduling the data (including new data and retransmission data) of HARQ process, it also starts the CG timer.

Thus, it may be prevented that the terminal equipment 102 is unable to transmit new data caused by the terminal equipment 102 not receiving the downlink feedback information (DFI) transmitted by the network device 101 after transmitting the new data on the CG resource, and it may also be prevented that the terminal equipment 102 is unable to transmit new data forever caused by the terminal equipment 102 not receiving ACK feedback transmitted by the network device 101 after the network device 101 dynamically schedules the CG HARQ process of the terminal equipment 102. And furthermore, for each dynamically scheduled transmission, the terminal equipment 102 may have identical maximum ACK feedback waiting times, and support the network device to actively schedule retransmissions multiple times.

In this implementation, in order to avoid conflict between the HARQ transmission of CG and the HARQ scheduled by the network device 101, the terminal equipment 102 is unable to transmit the retransmission data of the HARQ process indicated by the dynamic scheduling after receiving the dynamic scheduling command from the network device 101.

When the terminal equipment 102 transmits the data (including the new data and retransmission data) on the uplink resource of the HARQ process dynamically scheduled by the network device 101 or receives a command from the network device 101 dynamically scheduling the data (including new data and retransmission data) of HARQ process, it starts the CG timer, so as to prevent the terminal equipment 102 from transmitting the retransmission data on the CG resource between the dynamic scheduling command and the dynamically scheduled uplink resource.

For each CG resource appearing periodically, only when the CG timer of the HARQ process is not running and the dynamic scheduling command of the network device 101 is not received, the terminal equipment 102 may transmit the new data of the HARQ process on the CG resources.

Figure 16:
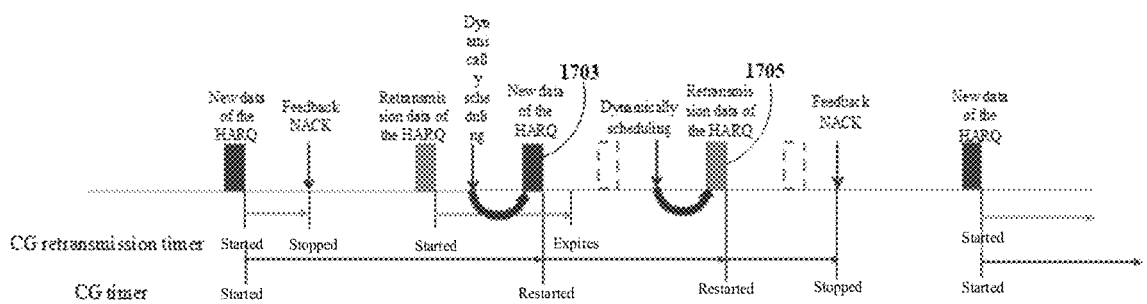
FIG. 16 is a schematic diagram of a process state of a timer and HARQ process in Implementation 4 of the second aspect of the embodiments of this disclosure.

FIG. 16 is a schematic diagram of a timer and a process state of an HARQ process in Implementation 4 of the second aspect of the embodiments of this disclosure.

A difference between FIG. 16 and FIG. 14 exists in that in FIG. 14, the terminal equipment 102 does not start the CG timer after transmitting the retransmission data on the uplink resource 1505 of the HARQ process dynamically scheduled by the network device 101, while in FIG. 8, the terminal equipment 102 starts the CG timer after transmitting the retransmission data on an uplink resource 1505 of the HARQ process dynamically scheduled by the network device 101. Furthermore, in FIG. 14 and FIG. 16, the terminal equipment 102 starts the CG timer after transmitting new data on the uplink resource 1503 or 1703 of the HARQ process dynamically scheduled by the network device 101.

Figure 17:
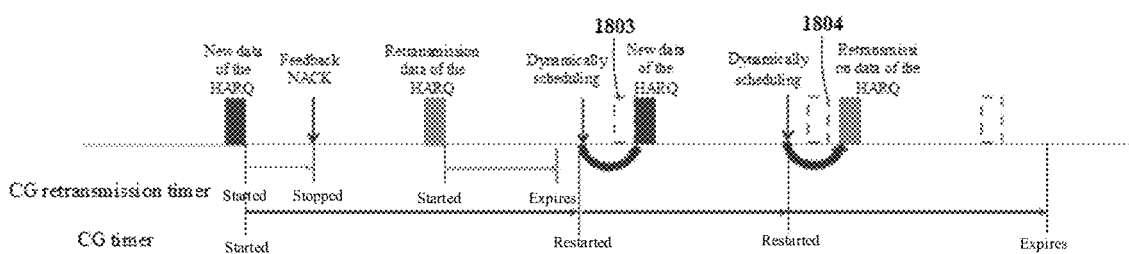
FIG. 17 is another schematic diagram of the process state of a timer and HARQ process in Implementation 4 of the second aspect of the embodiments of this disclosure.

FIG. 17 is another schematic diagram of the timer and the process state of the HARQ process in Implementation 4 of the second aspect of the embodiments of this disclosure.

What is identical between FIG. 17 and FIG. 15 exists that when the terminal equipment 102 receives a command from the network device 101 dynamically scheduling newly transmitted data of the HARQ process, it starts the CG timer. For example, in FIG. 15, when the command of the network device 101 dynamically scheduling newly transmitted data of the HARQ process is received shown before the CG resource 1603, the CG timer is started; and in FIG. 17, when the command of the network device 101 dynamically scheduling newly transmitted data of the HARQ process is received shown before a CG resource 1803, the CG timer is started.

Furthermore, in FIG. 17, the terminal equipment 102 starts the CG timer when it receives a command from the network device 101 dynamically scheduling the retransmission data of the HARQ process (for example, before a CG resource 1804 in FIG. 9).

Third Aspect of the Embodiments

The third aspect of the embodiments of this disclosure provides a data transmission method, applied to a network device, such as the network device 101.

Figure 18:
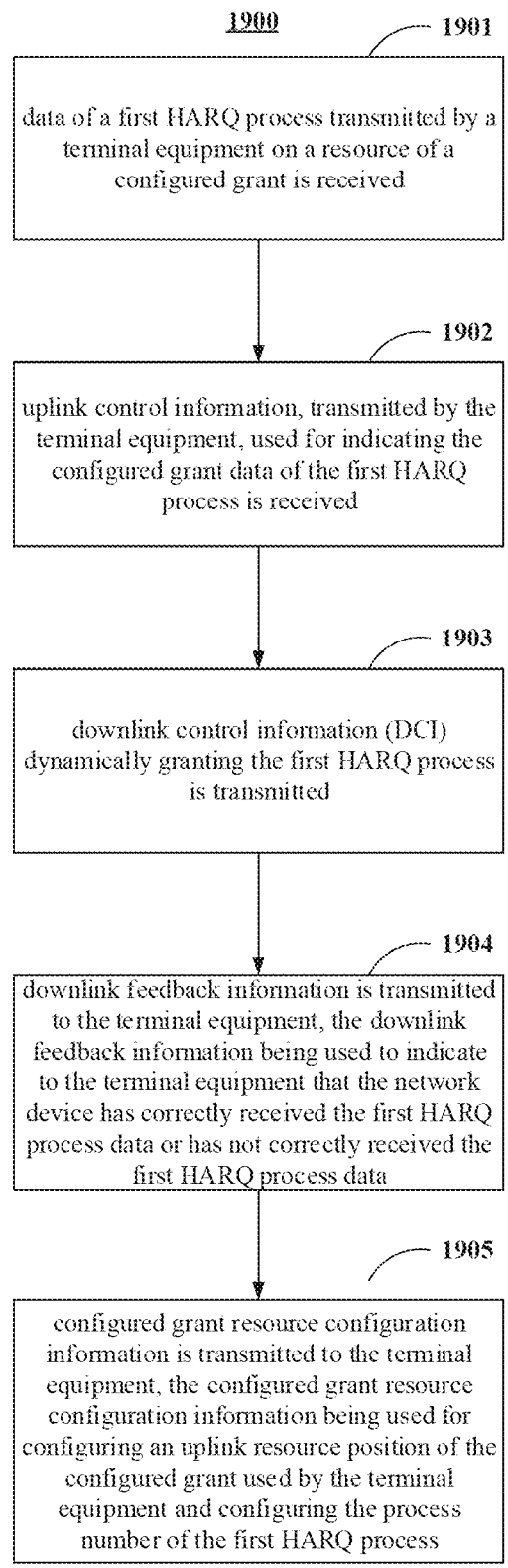
FIG. 18 is a schematic diagram of the data transmission method of the third aspect of the embodiments of this disclosure.

FIG. 18 is a schematic diagram of the data transmission method of the third aspect of the embodiments. As shown in FIG. 18, the method includes:

operation 1901: data of a first HARQ process transmitted by a terminal equipment on a resource of a configured grant is received; and operation 1902: uplink control information (UCI), transmitted by the terminal equipment, used for indicating the configured grant information of the first HARQ process is received, wherein the UCI contains a process identification of the first HARQ process, a network identifier of the terminal equipment and redundancy version (RV) information of a transport block of the first HARQ process.

In at least one embodiment, the identifier of the terminal equipment in the UCI is used to indicate to the network device that the data of the configured grant are new data or retransmission data of the first HARQ process. The network identifier of the terminal equipment is, for example, a C-RNTI, or a CS-RNTI, etc. For example, the C-RNTI of the terminal equipment 102 may be used to indicate the new data of the first HARQ process, and the CS-RNTI of the terminal equipment 102 may be used to indicate the retransmission data of the first HARQ process.

In at least one embodiment, the UCI may further include new data indication (NDI) information of the first HARQ process, wherein the new data indication information is used to indicate to the network device 101 that the configured grant data are new data or retransmission data of the first HARQ process.

For example, the new data indication (NDI) is identical to the new data indication (NDI) of a previous HARQ process, that is, the new data indication (NDI) is not inversed, indicating that the configured grant data are the retransmission data of the first HARQ process. And if the new data indication (NDI) is different from the new data indication (NDI) of the previous HARQ process, that is, the new data indication (NDI) is inversed, indicating that the configured grant data are the new data of the first HARQ process.

In at least one embodiment, as shown in FIG. 18, the method further includes:

operation 1903: downlink control information (DCI) dynamically granting the first HARQ process is transmitted, the DCI including a process number (HARQ ID) of the first HARQ process and redundancy version (RV) information of the first HARQ process transport block; wherein the DCI is scrambled by the network identifier of the terminal equipment.

In at least one embodiment, the network identifier of the terminal equipment in the DCI is used to indicate that the data dynamically granted by the terminal equipment 102 are new data or retransmission data of the first HARQ process. The network identifier of the terminal equipment may be, for example, a C-RNTI, or a CS-RNTI, etc. For example, the C-RNTI of the terminal equipment 102 may be used to indicate the new data of the first HARQ process, and the CS-RNTI of the terminal equipment 102 may be used to indicate the retransmission data of the first HARQ process.

In at least one embodiment, the DCI further includes new data indication (NDI) of the first HARQ process. The new data indication information in the UCI is used to indicate that the data dynamically granted by the terminal equipment are new data or retransmission data of the first HARQ process. For example, that the new data indication (NDI) is identical to the new data indication (NDI) of a previous HARQ process, that is, the new data indication (NDI) is not inversed, which indicates that the configured grant data are the retransmission data of the first HARQ process, and if the new data indication (NDI) is different from the new data indication (NDI) of the previous HARQ process, that is, the new data indication (NDI) is inversed, which indicates that the configured grant data are the new data of the first HARQ process.

In at least one embodiment, as shown in FIG. 18, the method further includes:

operation 1904: downlink feedback information is transmitted to the terminal equipment, the downlink feedback information being used to indicate to the terminal equipment that the network device has correctly received the first HARQ process data or has not correctly received the first HARQ process data.

The first HARQ process data include new data or retransmission data.

In at least one embodiment, as shown in FIG. 18, the method further includes:

operation 1905: configured grant resource configuration information is transmitted to the terminal equipment, the configured grant resource configuration information being used for configuring an uplink resource position of the configured grant used by the terminal equipment and configuring the process number of the first HARQ process.

The CG resource configuration information includes: a period of the uplink resource, a duration of the uplink resource, and an offset of the uplink resource in the period, the period, duration and offset being in units of OFDM symbols, slots, or subframes.

Hence, the terminal equipment may transmit the data on the CG (configured grant) uplink resources appearing periodically, without needing to receive PDCCH signaling transmitted by the network device in advance.

Fourth Aspect of the Embodiments

The fourth aspect of the embodiments of this disclosure provides a data transmission apparatus, applicable to a terminal equipment, such as the terminal equipment 102. The data transmission apparatus is used to carry out the data transmission method described in the first aspect of the embodiments.

Figure 19:
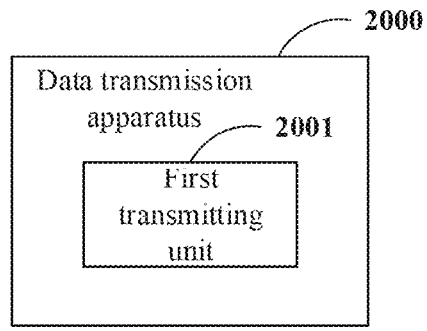
FIG. 19 is a schematic diagram of the data transmission apparatus of the fourth aspect of the embodiments of this disclosure.

FIG. 19 is a schematic diagram of the data transmission apparatus of the fourth aspect of the embodiments of this disclosure. As shown in FIG. 19, a data transmission apparatus 2000 includes a first transmitting unit 2001.

The first transmitting unit 2001 may implement the data transmission method 200 described in the first aspect of the embodiments of this disclosure. For description of carrying out the data transmission method 200 by the first transmitting unit 2001, reference may be made to the description of the data transmission method 200 in the first aspect of the embodiments of this disclosure.

Fifth Aspect of the Embodiments

The fifth aspect of the embodiments of this disclosure provides a data transmission apparatus, applicable to a terminal equipment, such as the terminal equipment 102. The data transmission apparatus is used to carry out the data transmission method described in the second aspect of the embodiments.

Figure 20:
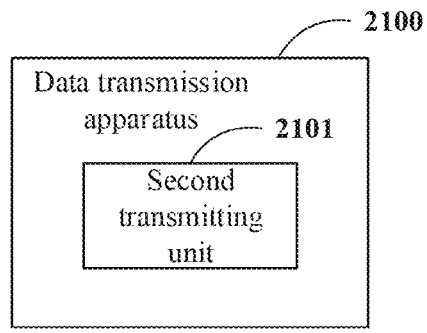
FIG. 20 is a schematic diagram of the data transmission apparatus of the fifth aspect of the embodiments of this disclosure.

FIG. 20 is a schematic diagram of the data transmission apparatus of the fifth aspect of the embodiments of this disclosure. As shown in FIG. 20, a data transmission apparatus 2100 includes a first transmitting unit 2101.

The first transmitting unit 2101 may implement the data transmission method 1100 described in the second aspect of the embodiments of this disclosure. For description of carrying out the data transmission method 1100 by the first transmitting unit 2001, reference may be made to the description of the data transmission method 1100 in the second aspect of the embodiments of this disclosure.

Sixth Aspect of the Embodiments

The sixth aspect of the embodiments of this disclosure provides a data transmission apparatus, applicable to a network device, such as the network device 101. The data transmission apparatus is used to carry out the data transmission method described in the second aspect of the embodiments.

Figure 21:
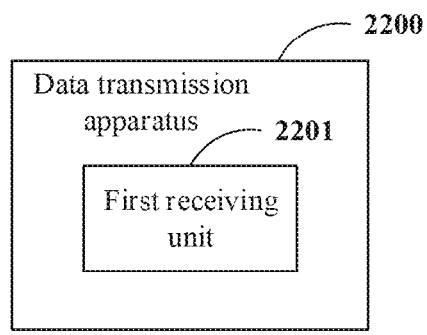
FIG. 21 is a schematic diagram of the data transmission apparatus of the sixth aspect of the embodiments of this disclosure.

FIG. 21 is a schematic diagram of the data transmission apparatus of the fifth aspect of the embodiments of this disclosure. As shown in FIG. 21, a data transmission apparatus 2200 includes a first receiving unit 2201.

The first receiving unit 2201 may carry out the data transmission method 1900 described in the third aspect of the embodiments of this disclosure. For description of carrying out the data transmission method 1900 by the second transmitting unit 2201, reference may be made to the description of the data transmission method 1900 in the third aspect of the embodiments of this disclosure.

Seventh Aspect of the Embodiments

The seventh aspect of the embodiments of this disclosure provides a terminal equipment, including the data transmission apparatus 2000 described in the fourth aspect of the embodiments or the data transmission apparatus 2100 described in the fifth aspect of the embodiments.

Figure 22:
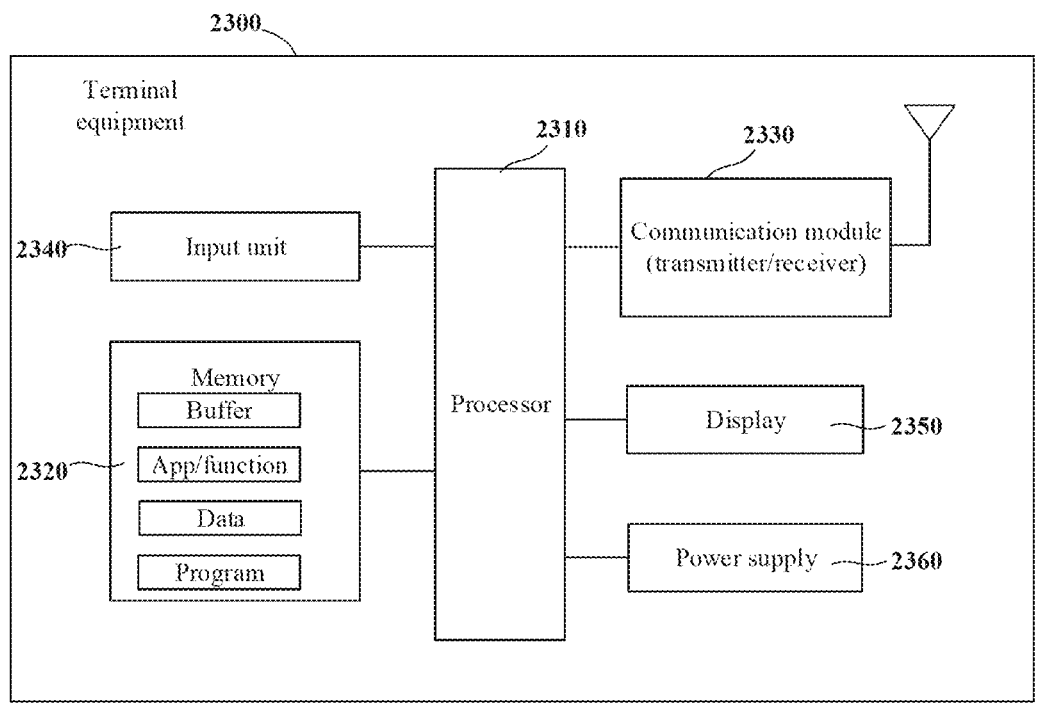
FIG. 22 is a block diagram of a systematic structure of the terminal equipment of the seventh aspect of the embodiments of this disclosure.

FIG. 22 is a block diagram of a systematic structure of a terminal equipment 2300 of the seventh aspect of the embodiments of this disclosure. As shown in FIG. 22, the terminal equipment 2300 may include a processor 2310 and a memory 2320, the memory 2320 being coupled to the processor 2310. It should be noted that this figure is illustrative only, and other types of structures may also be used, so as to supplement or replace this structure and achieve a telecommunications function or other functions.

In one implementation, the functions of the data transmission apparatus 2000 or 2100 may be integrated into the processor 2310. The processor 2310 may be configured to be able to carry out the data transmission method 200 in the first aspect of the embodiments or the data transmission method 1100 in the second aspect of the embodiments.

In another implementation, the data transmission apparatus 2000 or 2100 and the processor 2310 may be configured separately; for example, the data transmission apparatus 2000 or 2100 may be configured as a chip connected to the processor 2310, and the functions of the data transmission apparatus 2000 or 2100 are executed under control of the processor 2310.

As shown in FIG. 22, the terminal equipment 2300 may further include a communication module 2330, an input unit 2340, a display 2350 and a power supply 2360. It should be noted that the terminal equipment 2300 does not necessarily include all the parts shown in FIG. 22. Furthermore, the terminal equipment 2300 may include parts not shown in FIG. 22, and the related art may be referred to.

As shown in FIG. 22, the processor 2310 is sometimes referred to as a controller or an operational control, which may include a microprocessor or other processor devices and/or logic devices. The processor 2310 receives input and controls operations of components of the terminal equipment 2300.

The memory 2320 may be, for example, one or more of a buffer memory, a flash memory, a hard drive, a mobile medium, a volatile memory, a nonvolatile memory, or other suitable devices, which may store various data, etc., and furthermore, store programs executing related information. And the processor 2310 may execute programs stored in the memory 2320, so as to realize information storage or processing, etc. Functions of other parts are similar to those of the related art, which shall not be described herein any further. The parts of the terminal equipment 2300 may be realized by specific hardware, firmware, software, or any combination thereof, without departing from the scope of this disclosure.

Eighth Aspect of the Embodiments

The eighth aspect of the embodiments of this disclosure provides a network device, including the data transmission apparatus 2200 described in the eighth aspect of the embodiments.

Figure 23:
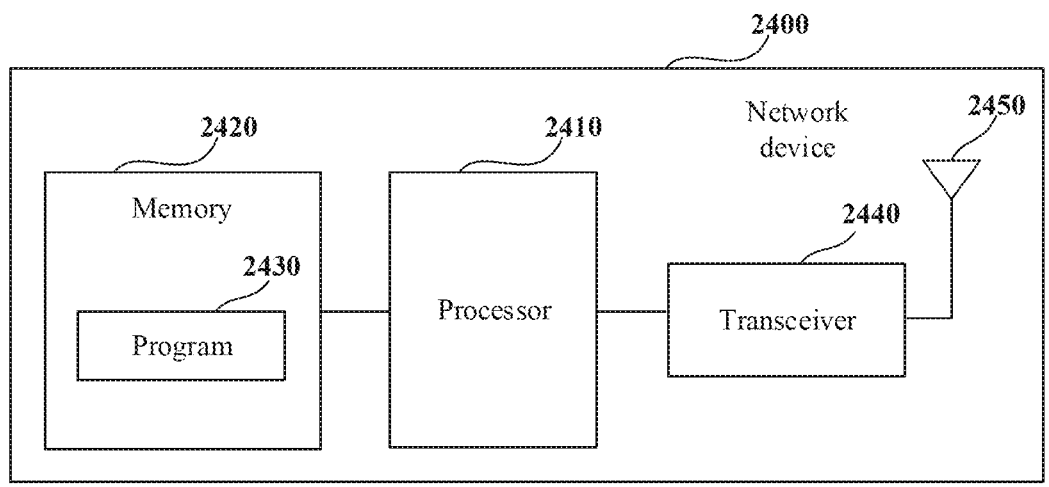
FIG. 23 is a block diagram of a structure of the network device of the eighth aspect of the embodiments of this disclosure.

FIG. 23 is a schematic diagram of a structure of the network device of the embodiment of this disclosure. As shown in FIG. 23, a network device 2400 may include a processor 2410 and a memory 2420, the memory 2420 being coupled to the processor 2410. The memory 2420 may store various data, and furthermore, it may store a program 2430 for data processing, and execute the program 2430 under control of the processor 2410, so as to receive various information transmitted by a user equipment, and transmit request information to the user equipment.

In one implementation, the functions of the data transmission apparatus 2200 may be integrated into the processor 2410. The processor 2410 may be configured to be able to carry out the data transmission method 1900 in the third aspect of the embodiments.

In another implementation, the data transmission apparatus 2200 and the processor 2410 may be configured separately; for example, the data transmission apparatus 2200 may be configured as a chip connected to the processor 2410, and the functions of the data transmission apparatus 2200 are executed under control of the processor 2410.

Furthermore, as shown in FIG. 23, the network device 2400 may include a transceiver 2440, and an antenna 2450, etc. Functions of the above components are similar to those in the related art, and shall not be described herein any further. It should be noted that the network device 2400 does not necessarily include all the parts shown in FIG. 23, and furthermore, the network device 2400 may include parts not shown in FIG. 23, and the related art may be referred to.

Ninth Aspect of the Embodiments

The eighth aspect of the embodiments of this disclosure provides a communication system, including the network device described in the eighth aspect of the embodiments and the terminal equipment described in the seventh aspect of the embodiments.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

As to implementations containing the above embodiments, following supplements are further disclosed.

1. A data transmission method, applicable to a terminal equipment, the method comprising:

determining that a process state of a first HARQ process is a second state (ACK), transmitting new data according to a configured grant to which the first HARQ process corresponds, setting a process state to which the first HARQ process corresponds to be a first state (NACK), and starting a first timer and a second timer;

or, determining that a process state of the first HARQ process is a first state (NACK) and the second timer is not running, transmitting retransmission data according to a configured grant to which the first HARQ process corresponds, and starting the second timer.

2. The method according to supplement 1, wherein the method further comprises:

setting the process state to be the second state (ACK) when the first timer expires.

3. The method according to supplement 1, wherein that the second timer is not running comprises:

the second timer being not started, the second timer stopping after it expires, or the terminal equipment making the second timer stopped after the terminal equipment receives downlink feedback information to which the first HARQ corresponds transmitted by a network device.

4. The method according to any one of supplements 1-3, wherein the method further comprises:

stopping the second timer when the downlink feedback information transmitted by a network device indicating that the network device fails in receiving data of the first HARQ process is received; or stopping the first timer when the downlink feedback information transmitted by a network device indicating that the network device correctly receives data of the first HARQ process is received.

5. The data transmission method according to supplement 4, wherein, when the HARQ downlink feedback information transmitted by the network device indicating that reception of the data of the first HARQ process fails is received, the method further comprises: setting the process state to be the first state;

or, when the HARQ downlink feedback information transmitted by the network device indicating that the data of the first HARQ process is correctly received, the method further comprises: setting the process state to be the second state.

6. The data transmission method according to any one of supplements 1-3, wherein, when it is determined that no data is transmitted at a dynamic grant to which the first HARQ process corresponds or no command, transmitted by the network device, dynamically granting transmission of data in the first HARQ process is received, new data or retransmission data are transmitted according to the configured grant to which the first HARQ process corresponds.

7. The data transmission method according to any one of supplements 1-3, wherein, a length of the second timer is less than a length of the first timer.

8. The data transmission method according to any one of supplements 1-3, wherein the setting a process state to which the first HARQ process corresponds to be a first state according to a configured grant to which the first HARQ process corresponds comprises:

determining an NDI state of the first HARQ process as being inversed, generating a new data transport block of the first HARQ process in a media access control (MAC) layer, setting a state to which the first HARQ process corresponds to be the first state, and transmitting the new data transport block.

9. The data transmission method according to any one of supplements 1-3, wherein the transmitting retransmission data comprises:

determining that there exists a transport block in a buffer of the first HARQ process, and transmitting the transport block in the buffer.

10. The data transmission method according to any one of supplements 1-3, wherein, the starting a second timer according to a configured grant to which the first HARQ process corresponds comprises:

determining that the retransmission data is successfully transmitted, and starting the second timer.

11. The data transmission method according to supplement 10, wherein the method further comprises: determining that the retransmission data is successfully transmitted for the first time, and further starting the first timer.

12. The data transmission method according to any one of supplements 1-3, wherein, the starting a second timer and starting a first timer comprises:

determining that the new data are successfully transmitted, starting the second timer, and starting the first timer.

13. The data transmission method according to any one of supplements 1-3, wherein the method further comprises:

starting the first timer after transmitting the new data according to the dynamic grant to which the first HARQ process corresponds; or starting the first timer when a command dynamically granting transmission of new data in the first HARQ process transmitted by the network device is received.

14. The data transmission method according to supplement 13, wherein the starting the first timer after transmitting the new data according to the dynamic grant to which the first HARQ process corresponds comprises:

after transmitting the new data according to the dynamic grant to which the first HARQ process corresponds, determining that the new data are successfully transmitted, and starting the first timer.

15. The data transmission method according to supplement 13, wherein the method further comprises:

starting the first timer after transmitting the retransmission data according to the dynamic grant to which the first HARQ process corresponds; or, receiving a command, transmitted by the network device, dynamically granting transmission of retransmission data in the first HARQ process, and starting the first timer.

16. The method according to supplement 15, wherein the starting the first timer after transmitting the retransmission data according to the dynamic grant to which the first HARQ process corresponds comprises:

transmitting the retransmission data according to the dynamic grant to which the first HARQ process corresponds, determining that the retransmission data are successfully transmitted, and starting the first timer.

17. The data transmission method according to any one of supplements 1-3, wherein the method further comprises:

transmitting to the network device uplink control information (UCI) used for indicating the configured grant information of the first HARQ process, wherein the UCI contains a process identification of the first HARQ process, a network identifier of the terminal equipment and redundancy version (RV) information of the first HARQ process transport block.

18. The data transmission method according to supplement 17, wherein when the configured grant data have never been successfully transmitted, the UCI indicates that the configured grant data are new data, otherwise, the UCI indicates that the configured grant data are retransmission data.

19. The data transmission method according to supplement 17, wherein, the configured grant data are indicated via the network identifier of the terminal equipment in the UCI to the network device as being new data or retransmission data of the first HARQ process.

20. The data transmission method according to supplement 17, wherein, the UCI further comprises new data indication (NDI) information of the first HARQ process.

21. The data transmission method according to supplement 20, wherein, the configured grant data are indicated via the new data indication information in the UCI to the network device as being new data or retransmission data of the first HARQ process.

22. The data transmission method according to any one of supplements 1-3, wherein the method further comprises:

receiving downlink control information (DCI), transmitted by the network device, used for dynamically granting the first HARQ process, the DCI comprising a process number (HARQ ID) of the first HARQ process and redundancy version (RV) information of the first HARQ process transport block; wherein the DCI is scrambled by the network identifier of the terminal equipment.

23. The data transmission method according to supplement 22, wherein, the network identifier of the terminal equipment in the DCI is used to indicate that the data of the dynamic grant are new data or retransmission data of the first HARQ process.

24. The data transmission method according to supplement 22, wherein, the DCI further comprises new data indication (NDI) information of the first HARQ process.

25. The method according to supplement 24, wherein, the new data indication information in the DCI is used to indicate that the data dynamically granted by the terminal equipment are new data or retransmission data of the first HARQ process.

26. The data transmission method according to any one of supplements 1 to 25, wherein the method further comprises:

receiving configured grant resource configuration information transmitted by the network device, the configured grant resource configuration information being used for configuring an uplink resource position of the configured grant used by the terminal equipment and configuring the process number of the first HARQ process.

27. A data transmission method, applicable to a terminal equipment, the method comprising:

when a first timer is running and a second timer is not running, transmit retransmission data according to a configuration grant corresponding to a first hybrid automatic repeat request (HARQ) process, and start the second timer if LBT is not failed for transmission of a transport block for the retransmission data;

or, when the first timer is not running, transmit new data according to a configuration grant corresponding to the first HARQ process, and start the first timer and the second timer if LBT is not failed for transmission of a transport lock for the new data.

28. The data transmission method according to supplement 27, wherein, that the first timer is not running comprises that the first timer is not started, and the first timer is stopped after it expires, or the terminal equipment makes the first timer stopped when the terminal equipment receives downlink feedback information to which the first HARQ corresponds transmitted by a network device;

and that the second timer is not running comprises that the second timer is not started, and the second timer is stopped after it expires, or the terminal equipment makes the second timer stopped when the terminal equipment receives downlink feedback information to which the first HARQ corresponds transmitted by a network device.

29. The method according to supplement 27, wherein the method further comprises:

stopping the second timer when the downlink feedback information transmitted by the network equipment indicating that the network equipment fails in receiving data of the first HARQ process is received; or stopping the first timer when the downlink feedback information transmitted by the network equipment indicating that the network equipment correctly receives data of the first HARQ process is received.

30. The data transmission method according to supplement 27, wherein the method further comprises:

when it is determined that no data is transmitted at a dynamic grant to which the first HARQ process corresponds or no command, transmitted by the network device, dynamically granting transmission of data in the first HARQ process is received, transmitting new data or retransmission data according to the configured grant to which the first HARQ process corresponds.

31. The data transmission method according to supplement 27, wherein the method further comprises:

starting the first timer if LBT is not failed for transmission of a data according to the dynamic grant to which the first HARQ process corresponds, or starting the first timer when a command dynamically granting transmission of a data in the first HARQ process transmitted by the network equipment is received.

32. The data transmission method according to any one of supplements 27-31, wherein, a length of the second timer is less than a length of the first timer.

34. The data transmission method according to any one of supplements 27-31, wherein the transmitting new data according to a configured grant to which the first HARQ process corresponds comprises:

when LBT is not failed for transmission of a transport block in a buffer to which the first HARQ process corresponds or the first timer has been started for the transport block, and a state indicated by the new data of the first HARQ process is toggled, to generate a new data transport block by a media access control (MAC) layer, and to transmit the new data transmission block according to the configuration grant corresponding to the first HARQ process.

36. The data transmission method according to any one of supplements 27-31, wherein the method further comprises:

when the first timer is not running, and LBT is failed for transmission of the transport block in the buffer to which the first HARQ process corresponds or the first timer has not been started for the transport block, retransmit the transport block according to the configuration grant corresponding to the first HARQ process.

38. The data transmission method according to any one of supplements 27-31, wherein the method further comprises:

transmitting uplink control information (UCI) used for indicating the configuration grant information of the first HARQ process to the network equipment, wherein the UCI contains a process identification of the first HARQ process, a network identification of the terminal equipment and redundancy version (RV) information of the first HARQ process transport block.

39. The data transmission method according to supplement 38, wherein when the configured grant data have never been successfully transmitted, the UCI indicates that the configured grant data are new data, otherwise, the UCI indicates that the configured grant data are retransmission data.

40. The method according to supplement 38, wherein, the configured grant data are indicated via the identification of the terminal equipment in the UCI to the network device as being new data or retransmission data of the first HARQ process.

41. The data transmission method according to supplement 38, wherein, the UCI further comprises a new data indication (NDI) of the first HARQ process.

42. The data transmission method according to supplement 41, wherein, the configuration grant data is indicated via the new data identification in the terminal equipment in the UCI to the network equipment as being new data or retransmission data of the first HARQ process.

43. The data transmission method according to any one of supplements 27-31, wherein the method further comprises:

receiving downlink control information (DCI), transmitted by the network device, used for dynamically granting the first HARQ process, the DCI comprising a process number (HARQ ID) of the first HARQ process and redundancy version (RV) information of the first HARQ process transport block; wherein the DCI is scrambled by the network identifier of the terminal equipment.

44. The data transmission method according to supplement 43, wherein the method further comprises:

using the network identifier of the terminal equipment in the DCI to indicate that the data of the dynamic grant are new data or retransmission data of the first HARQ process.

45. The data transmission method according to supplement 41, wherein, the DCI further comprises new data indication information of the first HARQ process.

46. The method of supplement 45, wherein the method further comprises:

indicating according to the new data indication information in the DCI that the data dynamically granted by the terminal equipment are new data or retransmission data of the first HARQ process.

47. The data transmission method according to any one of supplements 27-46, wherein the method further comprises:

receiving configured grant resource configuration information transmitted by the network device, the configured grant resource configuration information being used for configuring an uplink resource position of the configured grant used by the terminal equipment and configuring the process number of the first HARQ process.

48. A data transmission method, applicable to a network device, the method comprising:

receiving data of a first HARQ process transmitted by a terminal equipment on a resource of a configured grant; and receiving uplink control information (UCI), transmitted by the terminal equipment, used for indicating the configured grant data of the first HARQ process, wherein the UCI contains a process identification of the first HARQ process, a network identifier of the terminal equipment and redundancy version (RV) information of the first HARQ process transport block.

49. The data transmission method according to supplement 48, wherein, the network identifier of the terminal equipment in the UCI is used to indicate to the network device that the data of the configured grant are new data or retransmission data of the first HARQ process.

50. The data transmission method according to supplement 48, wherein, the UCI further includes new data indication (NDI) information of the first HARQ process.

51. The data transmission method according to supplement 50, wherein, the new data indication information in the UCI is used to indicate to the network device that the configured grant data are new data or retransmission data of the first HARQ process.

52. The data transmission method according to supplement 48, wherein the method further comprises:

transmitting downlink control information (DCI) dynamically granting the first HARQ process, the DCI comprising a process number (HARQ ID) of the first HARQ process and redundancy version (RV) information of the first HARQ process transport block; wherein the DCI is scrambled by the network identifier of the terminal equipment.

53. The data transmission method according to supplement 52, wherein, the network identifier of the terminal equipment in the DCI is used to indicate that the data dynamically granted by the terminal equipment is new data or retransmission data of the first HARQ process.

54. The data transmission method according to supplement 52, wherein, the DCI further comprises new data indication (NDI) of the first HARQ process.

55. The data transmission method according to supplement 54, wherein, the new data indication information in the UCI is used to indicate that the data dynamically granted by the terminal equipment are new data or retransmission data of the first HARQ process.

56. The data transmission method according to supplement 48, wherein the method further comprises:

transmitting downlink feedback information to the terminal equipment, the downlink feedback information being used to indicate to the terminal equipment that the network device has correctly received the first HARQ process data or has not correctly received the first HARQ process data.

57. The data transmission method according to any one of supplements 48-56, wherein the method further comprises:

transmitting configured grant resource configuration information to the terminal equipment, the configured grant resource configuration information being used for configuring an uplink resource position of the configured grant used by the terminal equipment and configuring the process number of the first HARQ process.

58. A terminal equipment, comprising a memory and a processor, the memory storing a computer program, and the processor being configured to execute the computer program to carry out the data transmission method as described in any one of supplements 1-47.

59. A network device, comprising a memory and a processor, the memory storing a computer program, and the processor being configured to execute the computer program to carry out the data transmission method as described in any one of supplements 48-57.

What is claimed is:

1. A data transmission apparatus, being installed in a terminal equipment, the data transmission apparatus comprising a first transmitter, the first transmitter is configured to:

when a first timer is running and a second timer is not running, transmit retransmission data according to a configuration grant corresponding to a first hybrid automatic repeat request (HARQ) process, and start the second timer if LBT (Listen before Talk) is not failed for transmission of a transport block for the retransmission data;

or, when the first timer is not running, transmit new data according to a configuration grant corresponding to the first HARQ process, and start the first timer and the second timer if LBT is not failed for transmission of a transport block for the new data.

2. The apparatus of data transmission according to claim 1, wherein, the first transmitter is further configured to:

stop the second timer when the downlink feedback information transmitted by the network equipment indicating that the network equipment fails in receiving data of the first HARQ process is received; or stop the first timer when the downlink feedback information transmitted by the network equipment indicating that the network equipment correctly receives data of the first HARQ process is received.

3. The apparatus of data transmission according to claim 1, wherein the first transmitter is further configured to:

start the first timer if LBT is not failed for transmission of a data according to the dynamic grant to which the first HARQ process corresponds, or start the first timer when a command dynamically granting transmission of a data in the first HARQ process transmitted by the network equipment is received.

4. The apparatus of data transmission according to claim 1, wherein the transmitting new data according to a configuration grant corresponding to the first HARQ process, comprise:

when LBT is not failed for transmission of a transport block in a buffer to which the first HARQ process corresponds or the first timer has been started for the transport block, and a state indicated by the new data of the first HARQ process is toggled, to generate a new data transport block by a media access control (MAC) layer, and to transmit the new data transmission block according to the configuration grant corresponding to the first HARQ process.

5. The apparatus of data transmission according to claim 1, wherein the first transmitter is further configured to:

when the first timer is not running, and LBT is failed for transmission of the transport block in the buffer to which the first HARQ process corresponds or the first timer has not been started for the transport block, retransmit the transport block according to the configuration grant corresponding to the first HARQ process.

6. The apparatus of data transmission according to claim 1, wherein the first transmitter is further configured to:
transmit uplink control information (UCI) used for indicating the configuration grant information of the first HARQ process to the network equipment, wherein the UCI contains a process identification of the first HARQ process, a network identification of the terminal equipment and redundancy version (RV) information of the first HARQ process transport block.

7. The apparatus of data transmission according to claim 6, wherein
the UCI further comprises a new data indication (NDI) of the first HARQ process.

8. The apparatus according to claim 7, wherein,
the configuration grant data is indicated via the new data identification in the terminal equipment in the UCI to the network equipment as being new data or retransmission data of the first HARQ process.

9. A communication system, comprising:
a network equipment; and
a terminal equipment, comprising a data transmission apparatus, being installed in a terminal equipment, the data transmission apparatus comprising a first transmitter, the first transmitter is configured to:
when a first timer is running and a second timer is not running, transmit retransmission data according to a configuration grant corresponding to a first hybrid automatic repeat request (HARQ) process, and start the second timer if LBT (Listen before Talk) is not failed for transmission of a transport block for the retransmission data;
or,
when the first timer is not running, transmit new data according to a configuration grant corresponding to the first HARQ process, and start the first timer and the second timer if LBT is not failed for transmission of a transport block for the new data.

* * * * *